United States Patent
Brown

(10) Patent No.: US 12,461,419 B2
(45) Date of Patent: *Nov. 4, 2025

(54) CONTROLLER FOR OPTICALLY-SWITCHABLE WINDOWS

(71) Applicant: View, Inc., Milpitas, CA (US)

(72) Inventor: Stephen Clark Brown, San Mateo, CA (US)

(73) Assignee: View Operating Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,607

(22) Filed: Sep. 13, 2023

(65) Prior Publication Data

US 2024/0077780 A1 Mar. 7, 2024

Related U.S. Application Data

(63) Continuation of application No. 16/948,341, filed on Sep. 14, 2020, now Pat. No. 11,796,885, which is a
(Continued)

(51) Int. Cl.
*G02F 1/163* (2006.01)
*E06B 9/24* (2006.01)
*G05B 13/02* (2006.01)

(52) U.S. Cl.
CPC ............ *G02F 1/163* (2013.01); *E06B 9/24* (2013.01); *G05B 13/024* (2013.01); *E06B 2009/2464* (2013.01)

(58) Field of Classification Search
CPC .... G02F 1/163; E06B 9/24; E06B 2009/2464; G05B 13/024
See application file for complete search history.

(56) References Cited

U.S. PATENT DOCUMENTS

| 4,148,015 A | 4/1979 | Sekiya et al. |
| 4,491,727 A | 1/1985 | Appelbaum et al. |
(Continued)

FOREIGN PATENT DOCUMENTS

| CN | 2590732 Y | 12/2003 |
| CN | 101501757 A | 8/2009 |
(Continued)

OTHER PUBLICATIONS

Stephen J. Martel, Scientific Programming Lab Notes Lecture Notes, Sep. 2004, Department of Geology and Geophysics School of Ocean and Earth Science and Technology University of Hawai'i at Manoa (Year: 2004).*
(Continued)

*Primary Examiner* — Tameem D Siddiquee
(74) *Attorney, Agent, or Firm* — Cha & Reiter, LLC

(57) ABSTRACT

This disclosure provides a window controller that includes a command-voltage generator that generates a command voltage signal, and a pulse-width-modulated-signal generator that generates a pulse-width-modulated signal based on the command voltage signal. The pulse-width-modulated signal drives an optically-switchable device. The pulse-width-modulated signal comprises a first power component having a first duty cycle and a second power component having a second duty cycle. The first component delivers a first pulse during each active portion of the first duty cycle, and the second component delivers a second pulse during each active portion of the second duty cycle. The first pulses are applied to a first conductive layer and the second pulses are applied to a second conductive layer. The relative durations of the active portions and the relative durations of the first and second pulses are adjusted to result in a change in an effective DC voltage applied across the optically-switchable device.

13 Claims, 8 Drawing Sheets

Related U.S. Application Data continuation of application No. 15/882,719, filed on Jan. 29, 2018, now Pat. No. 10,809,589, which is a continuation of application No. 13/449,248, filed on Apr. 17, 2012, now abandoned.

(56) References Cited

U.S. PATENT DOCUMENTS

| | | |
|---|---|---|
| 4,923,289 A | 5/1990 | Demiryont |
| 5,124,833 A | 6/1992 | Barton et al. |
| 5,170,108 A | 12/1992 | Peterson et al. |
| 5,204,778 A | 4/1993 | Bechtel |
| 5,217,296 A | 6/1993 | Tanner et al. |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,384,578 A | 1/1995 | Lynam et al. |
| 5,390,045 A | 2/1995 | Bernard, Jr. |
| 5,402,144 A | 3/1995 | Ripoche |
| 5,451,822 A | 9/1995 | Bechtel et al. |
| 5,598,000 A | 1/1997 | Popat |
| 5,606,393 A | 2/1997 | Schoenherr et al. |
| 5,621,526 A | 4/1997 | Kuze |
| 5,673,028 A | 9/1997 | Levy |
| 5,694,144 A | 12/1997 | Lefrou et al. |
| 5,764,402 A | 6/1998 | Thomas et al. |
| 5,822,107 A * | 10/1998 | Lefrou .................... G02F 1/163 359/275 |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen |
| 6,039,850 A | 3/2000 | Schulz |
| 6,055,089 A | 4/2000 | Schulz et al. |
| 6,084,700 A | 7/2000 | Knapp et al. |
| 6,130,448 A | 10/2000 | Bauer et al. |
| 6,130,772 A | 10/2000 | Cava |
| 6,222,177 B1 | 4/2001 | Bechtel et al. |
| 6,262,831 B1 | 7/2001 | Bauer et al. |
| 6,362,806 B1 | 3/2002 | Reichmann et al. |
| 6,386,713 B1 | 5/2002 | Turnbull et al. |
| 6,407,468 B1 | 6/2002 | LeVesque et al. |
| 6,407,847 B1 | 6/2002 | Poll et al. |
| 6,417,500 B1 | 7/2002 | Wood |
| 6,449,082 B1 | 9/2002 | Agrawal et al. |
| 6,471,360 B2 | 10/2002 | Rukavina et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,707,590 B1 | 3/2004 | Bartsch |
| 6,795,226 B2 | 9/2004 | Agrawal et al. |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 6,954,299 B1 | 10/2005 | Huang et al. |
| 7,085,609 B2 | 8/2006 | Bechtel et al. |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Whitesides et al. |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,610,910 B2 | 11/2009 | Ahmed |
| 7,722,966 B1 | 5/2010 | Lee et al. |
| 7,817,326 B1 | 10/2010 | Rennig et al. |
| 7,822,490 B2 | 10/2010 | Bechtel et al. |
| 7,873,490 B2 | 1/2011 | MacDonald |
| 7,941,245 B1 | 5/2011 | Popat |
| 7,972,021 B2 | 7/2011 | Scherer |
| 7,990,603 B2 | 8/2011 | Ash et al. |
| 8,004,739 B2 | 8/2011 | Letocart |
| 8,018,644 B2 | 9/2011 | Gustavsson et al. |
| 8,102,586 B2 | 1/2012 | Albahri |
| 8,213,074 B1 | 7/2012 | Shrivastava et al. |
| 8,254,013 B2 | 8/2012 | Mehtani et al. |
| 8,292,228 B2 | 10/2012 | Mitchell et al. |
| 8,296,287 B1 | 10/2012 | Cappiello et al. |
| 8,383,994 B2 | 2/2013 | Rashid et al. |
| 8,456,729 B2 | 6/2013 | Brown et al. |
| 8,547,624 B2 | 10/2013 | Ash et al. |
| 8,705,162 B2 | 4/2014 | Brown et al. |
| 8,723,467 B2 | 5/2014 | Berman et al. |
| 8,836,263 B2 | 9/2014 | Berman et al. |
| 8,864,321 B2 | 10/2014 | Mehtani et al. |
| 8,902,486 B1 | 12/2014 | Chandrasekhar |
| 8,976,440 B2 | 3/2015 | Berland et al. |
| 9,016,630 B2 | 4/2015 | Mitchell et al. |
| 9,030,725 B2 | 5/2015 | Pradhan et al. |
| 9,081,247 B1 | 7/2015 | Pradhan et al. |
| 9,938,765 B2 | 4/2018 | Berman et al. |
| 9,939,703 B1 | 4/2018 | Nguyen |
| 10,372,007 B1 | 8/2019 | Nagel et al. |
| 10,495,939 B2 | 12/2019 | Brown et al. |
| 10,768,503 B1 | 9/2020 | Nagel et al. |
| 10,809,587 B2 | 10/2020 | Brown et al. |
| 10,809,589 B2 | 10/2020 | Brown |
| 11,175,178 B2 | 11/2021 | Brown et al. |
| 11,237,449 B2 | 2/2022 | Brown et al. |
| 11,300,848 B2 | 4/2022 | Brown et al. |
| 11,422,580 B2 | 8/2022 | Liebl et al. |
| 11,709,409 B2 | 7/2023 | Brown et al. |
| 11,740,529 B2 | 8/2023 | Brown et al. |
| 11,796,885 B2 | 10/2023 | Brown |
| 11,796,886 B2 | 10/2023 | Brown |
| 12,105,395 B2 | 10/2024 | Brown et al. |
| 2002/0021481 A1 | 2/2002 | Lin et al. |
| 2002/0044331 A1 | 4/2002 | Agrawal et al. |
| 2002/0075472 A1 | 6/2002 | Holton |
| 2002/0152298 A1 | 10/2002 | Kikta et al. |
| 2003/0052854 A1 | 3/2003 | Juang |
| 2003/0137521 A1 | 7/2003 | Zehner et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0135989 A1 | 7/2004 | Klebe |
| 2004/0160322 A1 | 8/2004 | Stilp |
| 2005/0200934 A1 | 9/2005 | Callahan et al. |
| 2005/0225830 A1 | 10/2005 | Huang et al. |
| 2005/0268629 A1 * | 12/2005 | Ahmed .................... F24F 11/52 62/434 |
| 2005/0270620 A1 | 12/2005 | Bauer et al. |
| 2005/0278047 A1 | 12/2005 | Ahmed |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0207730 A1 | 9/2006 | Berman et al. |
| 2006/0209007 A1 | 9/2006 | Pyo et al. |
| 2006/0245024 A1 | 11/2006 | Greer |
| 2007/0002007 A1 | 1/2007 | Tam |
| 2007/0012349 A1 | 1/2007 | Gaudiana et al. |
| 2007/0067048 A1 | 3/2007 | Bechtel et al. |
| 2007/0097480 A1 | 5/2007 | Yang et al. |
| 2007/0162233 A1 | 7/2007 | Schwenke |
| 2007/0221338 A1 | 9/2007 | Meewis et al. |
| 2007/0285759 A1 | 12/2007 | Ash et al. |
| 2008/0018979 A1 | 1/2008 | Mahe et al. |
| 2008/0128586 A1 | 6/2008 | Johnson et al. |
| 2008/0230653 A1 | 9/2008 | Mitchell et al. |
| 2008/0234893 A1 | 9/2008 | Mitchell et al. |
| 2008/0239451 A1 | 10/2008 | Mitchell et al. |
| 2009/0013317 A1 | 1/2009 | Abfalter et al. |
| 2009/0020233 A1 | 1/2009 | Berman et al. |
| 2009/0027759 A1 | 1/2009 | Albahri |
| 2009/0066157 A1 | 3/2009 | Tarng et al. |
| 2009/0143141 A1 | 6/2009 | Wells et al. |

(56) References Cited

U.S. PATENT DOCUMENTS

| | | |
|---|---|---|
| 2009/0179923 A1 | 7/2009 | Amundson et al. |
| 2009/0243732 A1 | 10/2009 | Tarng et al. |
| 2009/0243802 A1 | 10/2009 | Wolf et al. |
| 2010/0039410 A1 | 2/2010 | Becker et al. |
| 2010/0066484 A1 | 3/2010 | Hanwright et al. |
| 2010/0082081 A1 | 4/2010 | Niessen et al. |
| 2010/0172009 A1 | 7/2010 | Matthews |
| 2010/0172010 A1* | 7/2010 | Gustavsson ............ G02F 1/163 359/265 |
| 2010/0188057 A1 | 7/2010 | Tarng |
| 2010/0235206 A1 | 9/2010 | Miller et al. |
| 2010/0237695 A1 | 9/2010 | Covaro et al. |
| 2010/0243427 A1 | 9/2010 | Kozlowski et al. |
| 2010/0245972 A1 | 9/2010 | Wright |
| 2010/0302624 A1* | 12/2010 | Moskowitz ............... E06B 9/24 359/296 |
| 2010/0315693 A1 | 12/2010 | Lam et al. |
| 2011/0046810 A1 | 2/2011 | Bechtel et al. |
| 2011/0063708 A1 | 3/2011 | Letocart |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0266419 A1 | 11/2011 | Jones et al. |
| 2011/0292488 A1 | 12/2011 | McCarthy et al. |
| 2011/0304898 A1 | 12/2011 | Letocart |
| 2011/0308318 A1 | 12/2011 | Magnussen |
| 2012/0007507 A1 | 1/2012 | Niemann et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0133315 A1 | 5/2012 | Berman et al. |
| 2012/0147449 A1 | 6/2012 | Bhatnagar et al. |
| 2012/0182593 A1 | 7/2012 | Collins et al. |
| 2012/0190386 A1 | 7/2012 | Anderson |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0268803 A1 | 10/2012 | Greer et al. |
| 2012/0293855 A1 | 11/2012 | Shrivastava et al. |
| 2012/0300516 A1 | 11/2012 | Chen et al. |
| 2012/0323382 A1 | 12/2012 | Kamel et al. |
| 2013/0038218 A1 | 2/2013 | Xu et al. |
| 2013/0043347 A1 | 2/2013 | Mitchell et al. |
| 2013/0057937 A1 | 3/2013 | Berman et al. |
| 2013/0063065 A1 | 3/2013 | Berman et al. |
| 2013/0158790 A1 | 6/2013 | McIntyre, Jr. et al. |
| 2013/0242370 A1 | 9/2013 | Wang |
| 2013/0263510 A1 | 10/2013 | Gassion |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0278988 A1 | 10/2013 | Jack et al. |
| 2014/0043669 A1 | 2/2014 | Bergh et al. |
| 2014/0067733 A1 | 3/2014 | Humann |
| 2014/0160550 A1 | 6/2014 | Brown et al. |
| 2014/0163742 A1 | 6/2014 | Element |
| 2014/0177027 A1 | 6/2014 | Wang et al. |
| 2014/0177028 A1 | 6/2014 | Shrivastava et al. |
| 2014/0236323 A1 | 8/2014 | Brown et al. |
| 2014/0259931 A1 | 9/2014 | Plummer |
| 2014/0268287 A1 | 9/2014 | Brown et al. |
| 2014/0300945 A1 | 10/2014 | Parker |
| 2014/0330538 A1 | 11/2014 | Conklin et al. |
| 2014/0368899 A1 | 12/2014 | Greer |
| 2014/0371931 A1 | 12/2014 | Lin et al. |
| 2015/0002919 A1 | 1/2015 | Jack et al. |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0092260 A1 | 4/2015 | Parker et al. |
| 2015/0109653 A1 | 4/2015 | Greer et al. |
| 2015/0110991 A1 | 4/2015 | Miwa et al. |
| 2015/0116808 A1 | 4/2015 | Branda et al. |
| 2015/0116811 A1 | 4/2015 | Shrivastava et al. |
| 2015/0122474 A1 | 5/2015 | Petersen |
| 2015/0185581 A1 | 7/2015 | Pradhan et al. |
| 2015/0219975 A1 | 8/2015 | Phillips et al. |
| 2015/0225999 A1 | 8/2015 | Berman et al. |
| 2015/0293422 A1 | 10/2015 | Pradhan et al. |
| 2015/0355520 A1 | 12/2015 | Chung et al. |
| 2015/0362728 A1 | 12/2015 | Tei |
| 2016/0079960 A1 | 3/2016 | Berscheid et al. |
| 2016/0090098 A1 | 3/2016 | Kim et al. |
| 2016/0154290 A1 | 6/2016 | Brown et al. |
| 2016/0203403 A1 | 7/2016 | Nagel et al. |
| 2016/0363799 A1 | 12/2016 | West et al. |
| 2017/0006694 A1 | 1/2017 | Davis et al. |
| 2017/0075183 A1 | 3/2017 | Brown |
| 2017/0075323 A1 | 3/2017 | Shrivastava et al. |
| 2017/0097259 A1 | 4/2017 | Brown et al. |
| 2017/0131610 A1 | 5/2017 | Brown et al. |
| 2017/0131611 A1 | 5/2017 | Brown et al. |
| 2017/0212400 A1 | 7/2017 | Shrivastava et al. |
| 2017/0285432 A1 | 10/2017 | Shrivastava et al. |
| 2017/0328121 A1 | 11/2017 | Purdy et al. |
| 2018/0088432 A1 | 3/2018 | Shrivastava et al. |
| 2018/0129172 A1 | 5/2018 | Shrivastava et al. |
| 2019/0011798 A9 | 1/2019 | Brown et al. |
| 2019/0018298 A1 | 1/2019 | Engfeldt et al. |
| 2019/0025661 A9 | 1/2019 | Brown et al. |
| 2019/0049812 A1 | 2/2019 | Brown |
| 2019/0294018 A1 | 9/2019 | Shrivastava et al. |
| 2019/0317458 A1 | 10/2019 | Shrivastava et al. |
| 2020/0004096 A1 | 1/2020 | Brown et al. |
| 2020/0132276 A1 | 4/2020 | Hetrick et al. |
| 2020/0209057 A1 | 7/2020 | Brown et al. |
| 2020/0241379 A1 | 7/2020 | Barnum et al. |
| 2020/0257179 A1* | 8/2020 | Barnum ............. H04L 63/0876 |
| 2020/0278245 A1 | 9/2020 | Brown et al. |
| 2021/0055619 A1 | 2/2021 | Brown |
| 2021/0063834 A1 | 3/2021 | Brown et al. |
| 2021/0072611 A1 | 3/2021 | Brown |
| 2021/0231981 A1 | 7/2021 | Wang et al. |
| 2022/0026267 A1 | 1/2022 | Brown et al. |
| 2022/0091469 A1 | 3/2022 | Brown et al. |
| 2022/0187667 A1 | 6/2022 | Nagel |
| 2022/0244608 A1 | 8/2022 | Brown et al. |
| 2023/0011016 A1 | 1/2023 | Martinson et al. |
| 2023/0041779 A1 | 2/2023 | Brown et al. |
| 2023/0074720 A1 | 3/2023 | Brown et al. |
| 2023/0324757 A1 | 10/2023 | Brown et al. |
| 2024/0103333 A1 | 3/2024 | Brown et al. |

FOREIGN PATENT DOCUMENTS

| | | |
|---|---|---|
| CN | 101707892 A | 5/2010 |
| CN | 101969207 A | 2/2011 |
| CN | 102203370 A | 9/2011 |
| CN | 103547965 A | 1/2014 |
| CN | 103649826 A | 3/2014 |
| CN | 104364706 A | 2/2015 |
| CN | 104603686 A | 5/2015 |
| CN | 104781493 A | 7/2015 |
| CN | 207652442 U | 7/2018 |
| DE | 10124673 A1 | 11/2002 |
| EP | 0445314 A1 | 9/1991 |
| EP | 0869032 A2 | 10/1998 |
| EP | 0920210 A1 | 6/1999 |
| EP | 1012633 B1 | 3/2002 |
| EP | 0835475 B1 | 9/2004 |
| EP | 1510854 A1 | 3/2005 |
| EP | 1417535 B1 | 11/2005 |
| EP | 1619546 A2 | 1/2006 |
| EP | 1626306 A2 | 2/2006 |
| EP | 2161615 A1 | 3/2010 |
| EP | 2357544 A2 | 8/2011 |
| EP | 2764998 A1 | 8/2014 |
| JP | S63208830 A | 8/1988 |
| JP | H02132420 A | 5/1990 |

(56) References Cited

FOREIGN PATENT DOCUMENTS

| | | |
|---|---|---|
| JP | H05178645 A | 7/1993 |
| JP | H1063216 A | 3/1998 |
| JP | 2004245985 A | 9/2004 |
| JP | 2008542578 A | 11/2008 |
| JP | 4351914 B2 | 10/2009 |
| JP | 2011008271 A | 1/2011 |
| JP | 4694816 B2 | 6/2011 |
| JP | 4799113 B2 | 10/2011 |
| JP | 2013057975 A | 3/2013 |
| JP | 2014515837 A | 7/2014 |
| JP | 2015045129 A | 3/2015 |
| KR | 200412640 Y1 | 3/2006 |
| KR | 100752041 B1 | 8/2007 |
| KR | 20080022319 A | 3/2008 |
| KR | 20090026181 A | 3/2009 |
| KR | 100904847 B1 | 6/2009 |
| KR | 100931183 B1 | 12/2009 |
| KR | 20100017542 A | 2/2010 |
| KR | 20100034361 A | 4/2010 |
| KR | 20110003698 A | 1/2011 |
| KR | 20110094672 A | 8/2011 |
| KR | 20180135741 A | 12/2018 |
| TW | 200532346 A | 10/2005 |
| TW | I243239 B | 11/2005 |
| TW | I286622 B | 9/2007 |
| TW | M419698 U | 1/2012 |
| TW | 201215981 A | 4/2012 |
| TW | 201217999 A | 5/2012 |
| TW | I387734 B | 3/2013 |
| TW | 201403034 A | 1/2014 |
| TW | I430251 B | 3/2014 |
| TW | 201510605 A | 3/2015 |
| WO | WO-9728484 A1 | 8/1997 |
| WO | WO-9816870 A1 | 4/1998 |
| WO | WO-9913359 A1 | 3/1999 |
| WO | WO-0213052 A2 | 2/2002 |
| WO | WO-0241740 A1 | 5/2002 |
| WO | WO-2004003649 A1 | 1/2004 |
| WO | WO-2005098811 A1 | 10/2005 |
| WO | WO-2005103807 A2 | 11/2005 |
| WO | WO-2007016546 A2 | 2/2007 |
| WO | WO-2007146862 A2 | 12/2007 |
| WO | WO-2008030018 A1 | 3/2008 |
| WO | WO-2008147322 A1 | 12/2008 |
| WO | WO-2009124647 A1 | 10/2009 |
| WO | WO-2010120771 A1 | 10/2010 |
| WO | WO-2011020478 A1 | 2/2011 |
| WO | WO-2011087684 A1 | 7/2011 |
| WO | WO-2011087687 A1 | 7/2011 |
| WO | WO-2011124720 A2 | 10/2011 |
| WO | WO-2011127015 A1 | 10/2011 |
| WO | WO-2012079159 A1 | 6/2012 |
| WO | WO-2012080618 A1 | 6/2012 |
| WO | WO-2012080656 A1 | 6/2012 |
| WO | WO-2012080657 A1 | 6/2012 |
| WO | WO-2012145155 A1 | 10/2012 |
| WO | WO-2013059674 A1 | 4/2013 |
| WO | WO-2013109881 A2 | 7/2013 |
| WO | WO-2013155467 A1 | 10/2013 |
| WO | WO-2013155612 A1 | 10/2013 |
| WO | WO-2013158365 A1 | 10/2013 |
| WO | WO-2014121863 A1 | 8/2014 |
| WO | WO-2014130471 A1 | 8/2014 |
| WO | WO-2014134451 A2 | 9/2014 |
| WO | WO-2014209812 A1 | 12/2014 |
| WO | WO-2015077097 A1 | 5/2015 |
| WO | WO-2015134789 A1 | 9/2015 |
| WO | WO-2017007841 A1 | 1/2017 |
| WO | WO-2018112241 A1 | 6/2018 |
| WO | WO-2020037055 A1 | 2/2020 |
| WO | WO-2021067505 A1 | 4/2021 |

OTHER PUBLICATIONS

Roger Mortimer, Switching Colors with Electricity, 2013, American Scientist, vol. 101, p. 38, https://www.americanscientist.org/article/switching-colors-with-electricity (Year: 2013).*

"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.

APC by Schneider Electric, Smart-UPS 120V Product Brochure, 2013, 8 pp.

AU Examination report dated Feb. 22, 2022, in Application No. AU2016346328.

AU Examination report dated Oct. 7, 2021, in AU Application No. 2016346328.

AU Office Action dated Jan. 24, 2022, in Application No. AU2020273368.

AU Office Action dated Jul. 14, 2022, in Application No. AU2020273368.

AU Office Action dated Jul. 28, 2023, in application No. AU2022204730.

Australian Examination Report dated Apr. 4, 2016 in AU Application No. 2013249706.

Australian Examination Report dated Jul. 10, 2019 in AU Application No. 2018203436.

Australian Examination Report dated Nov. 21, 2019 in AU Application No. 2018260906.

Australian Examination Report No. 1 dated Nov. 9, 2017 in AU Application No. 2017200334.

Australian Examination Report No. 2 dated Apr. 5, 2018 in AU Application No. 2017200334.

Australian Examination Report No. 3 dated Nov. 6, 2018 in AU Application No. 2017200334.

Australian Office Action dated May 21, 2021 in AU Application No. 2016346328.

CA Office Action dated Jan. 13, 2023, in Application No. CA3003639.

CA Office Action dated May 5, 2023, in Application No. CA2870673.

CA Office action dated Nov. 10, 2021, in CA Application No. CA2870673.

Canadian Examination Report dated Feb. 13, 2020 in CA Application No. 2,870,673.

Canadian Examination Report dated Jan. 18, 2019 in CA Application No. 2,870,673.

Chinese Notice of Grant & Search Report dated May 8, 2017 in CN Application No. 201380030251.8.

Chinese Office Action dated Sep. 7, 2016 in CN Application No. 201380030251.8.

Chinese Office Action dated Dec. 23, 2020 in CN Application No. 201710564603.8.

Chinese Office Action dated Feb. 3, 2020 in CN Application No. 201710564603.8.

Chinese Office Action dated Jul. 2, 2021 in CN Application No. 201810573469.2.

Chinese Office Action dated Jul. 21, 2020 in CN Application No. 201710564603.8.

Chinese Office Action dated Mar. 26, 2015 in CN Application No. 201280060910.8.

Chinese Office Action dated Mar. 3, 2021 in CN Application No. 201810573469.2.

Chinese Office Action dated Mar. 5, 2019 in CN Application No. 201680068239.X.

Chinese Office Action dated May 7, 2020 in CN Application No. 201810573469.2.

Chinese Office Action dated Sep. 6, 2019 in CN Application No. 201680068239.X.

CN Office Action dated Dec. 23, 2022 in Application No. CN201710564603.8 with English translation.

CN Office Action dated Mar. 24, 2023, in Application No. CN201710564603.8 with English translation.

CN Office Action dated May 6, 2022 in Application No. CN202010475742 With English Translation.

CN Office Action dated Nov. 3, 2022, in Application No. CN202010475742.5 with English translation.

(56) References Cited

OTHER PUBLICATIONS

CN Office Action dated Sep. 28, 2022 in CN Application No. 201710564603.8 with English translation.
CN Office Action dated Sep. 3, 2021, in CN Application No. CN202010475742.5 with English translation.
Communication re Third-Party Observation dated Dec. 4, 2014 and Third-Party Observation dated Dec. 3, 2014 in PCT/US2014/016974.
Duchon, Claude E. et al., "Estimating Cloud Type from Pyranometer Observations," Journal of Applied Meteorology, vol. 38, Jan. 1999, pp. 132-141.
EP Office Action dated Sep. 30, 2021, in application No. EP19185576.6.
European Decision to Refuse dated Jun. 6, 2019 in EP Application No. 13777692.8.
European Extended Search Report dated Dec. 13, 2019 in EP Application No. 19185576.6.
European Extended Search Report dated Jan. 25, 2016 in EP Application No. 13777692.8.
European Extended Search Report dated May 31, 2019 in EP Application No. 16860691.1.
European Office Action dated Apr. 8, 2020 in EP Application No. 18186062.8.
European Office Action dated Mar. 11, 2021 in EP Application No. 16860691.1.
European Office Action dated Mar. 31, 2017 in EP Application No. 13777692.8.
European Office Action dated Sep. 26, 2022 in Application No. EP18186062.8.
European Partial Search Report dated Oct. 6, 2015 in EP Application No. 13777692.8.
European Search Report dated Aug. 11, 2014 in European Application No. 12757877.1.
European Search Report dated Jul. 23, 2014 in European Application No. 12756917.6.
European Search Report dated Jul. 29, 2014 in European Application No. 12758250.0.
European Search Report dated Mar. 5, 2015 in European Application No. 12841714.4.
European Summons to Oral Proceedings dated Jun. 27, 2018 in EP Application No. 13777692.8.
Examiner's Answer dated Jan. 27, 2017 in U.S. Appl. No. 13/449,248.
Examiner's Answer dated Nov. 28, 2016 in U.S. Appl. No. 13/449,251.
Extended European Search Report dated Nov. 30, 2018 in EP Application No. 18186062.8.
Extended European Search Report mailed on Nov. 29, 2021, in the application EP21185911.1.
Final Office Action dated Jun. 5, 2015 in U.S. Appl. No. 13/968,258.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [http://theweatherprediction.com/habyhints2/512/].
"Halio Rooftop Sensor Kit (Model SR500)," Product Data Sheet, Kinestral Technologies, 2020, 4 pp.
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&nl=11774).
"How Cleantech wants to make a 2012 comeback" http://mountainview.patch.com/articles/how-cleantech-wants-to-make-a-2012-comeback, Jan. 23, 2012.
IN Office Action dated Jul. 25, 2022, in Application No. IN202038028121.
IN Office Action dated Mar. 8, 2022 in Application No. IN202138034709.
IN Office Action dated Mar. 25, 2022, in Application No. IN202038028121.
Indian Office Action dated Feb. 10, 2021 in IN Application No. 201837015533.
Indian Office Action dated Oct. 4, 2019 in IN Application No. 2514/KOLNP/2014.
International Preliminary Report on Patentability dated Feb. 19, 2015 issued in PCT/US2013/053625.
International Preliminary Report on Patentability dated May 1, 2014 in PCT/US2012/061137.
International Preliminary Report on Patentability dated May 11, 2018 in PCT/US2016/058872.
International Preliminary Report on Patentability dated Oct. 23, 2014 issued in PCT/US2013/036456.
International Preliminary Report on Patentability dated Oct. 30, 2014 issued in PCT/US2013/034998.
International Preliminary Report on Patentability dated Oct. 30, 2014 issued in PCT/US2013/036235.
International Preliminary Report on Patentability dated Sep. 26, 2013, issued in PCT/US2012/027742.
International Preliminary Report on Patentability dated Sep. 26, 2013, issued in PCT/US2012/027828.
International Preliminary Report on Patentability dated Sep. 26, 2013, issued in PCT/US2012/027909.
International Search Report and Written Opinion dated Dec. 26, 2013, issued in PCT/US2013/053625.
International Search Report and Written Opinion dated Jul. 11, 2013, issued in PCT/US2013/034998.
International Search Report and Written Opinion dated Jul. 23, 2013, issued in PCT/US2013/036235.
International Search Report and Written Opinion dated Jul. 26, 2013, issued in PCT/US2013/036456.
International Search Report and Written Opinion dated Mar. 28, 2013 in PCT/US2012/061137.
International Search Report and Written Opinion dated May 26, 2014 in PCT/US2014/016974.
International Search Report and Written Opinion dated Nov. 18, 2022 in PCT Application No. PCT/US2022/074066.
International Search Report and Written Opinion dated Oct. 16, 2014, issued in PCT/US2014/043514.
International Search Report and Written Opinion dated Sep. 24, 2012, issued in PCT/US2012/027742.
International Search Report and Written Opinion dated Sep. 24, 2012, issued in PCT/US2012/027909.
International Search Report and Written Opinion dated Sep. 26, 2012, issued in PCT/US2012/027828.
International Search Report and Written Opinion (ISA/KR) dated Feb. 3, 2017 in PCT/US2016/058872.
Japanese Office Action dated Nov. 10, 2020 in JP Application No. 2018-521413.
JP Decision of Rejection dated Sep. 21, 2021, in application No. JP2018-521413.
JP Office Action dated Nov. 15, 2022 in Application No. JP2021-207119.
Kipp & Zonen, "Solar Radiation" (known as of Sep. 3, 2014) [http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Korean Office Action dated Apr. 18, 2019 in KR Application No. 10-2014-7032108.
Korean Office Action dated Apr. 27, 2021 in KR Application No. 10-2021-7003065.
Korean Office Action dated May 25, 2020 in KR Application No. 10-2020-7005628.
KR Office Action dated May 28, 2022, in Application No. KR10-2022-7004024.
Letter dated Dec. 1, 2014 re Prior Art re U.S. Appl. No. 13/772,969 from Ryan D. Ricks representing MechoShade Systems, Inc.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.

(56) References Cited

OTHER PUBLICATIONS

Martel. S.J, et al., "Scientific Programming Lab Notes Lecture Notes", Department of Geology and Geophysics School of Ocean and Earth Science and Technology University of Hawaii at Manoa, Sep. 2004, pp. 3.
National Aeronautics & Space Administration, "Cloud Radar System (CRS)," (known as of Sep. 3, 2014), published date of Jun. 16, 2014, [ http://har.gsfc.nasa.gov/index.php?section=12].
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134 ].
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
Notice of Allowance dated Nov. 16, 2021 in U.S. Appl. No. 16/948,340.
Notice of Allowance dated Oct. 14, 2021 in U.S. Appl. No. 16/871,976.
Office Action dated Oct. 6, 2014 in U.S. Appl. No. 13/968,258.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Preliminary Amendment filed Jun. 12, 2019 for U.S. Appl. No. 15/882,719.
Preliminary Amendment filed Nov. 12, 2020 for U.S. Appl. No. 16/948,341.
"Remote Sensing: Clouds," Department of Atmospheric and Ocean Science, University of Maryland, (known as of Sep. 3, 2014) [http://www.atmos.umd.edu/~pinker/remote_sensing_clouds.htm].
Russian Office Action dated Nov. 15, 2017 in RU Application No. 2014145822.
Russian Office Action dated Jun. 27, 2017 in RU Application No. 2014145822.
Science and Technology Facilities Council. "Cloud Radar: Predicting The Weather More Accurately." ScienceDaily, Oct. 1, 2008. [www.sciencedaily.com/releases/2008/09/080924085200.htm].
Singapore Notice of Eligibility for Grant & Search/Examination Report dated Sep. 15, 2015 in SG Application No. 11201406722V.
Taiwanese Office Action dated Aug. 24, 2020 in TW Application No. 105134929.
Taiwanese Office Action dated Dec. 30, 2020 in TW Application No. 108114019.
Taiwanese Office Action dated Jul. 2, 2020 in TW Application No. 107119905.
Taiwanese Office Action dated Jul. 30, 2018 in TW Application No. 106137770.
Taiwanese Office Action dated Jun. 29, 2021 in TW Application No. 110115755.
Taiwanese Office Action dated Mar. 30, 2017 in TW Application No. 102113541.
Third-Party Submission dated Feb. 2, 2015 and Feb. 18, 2015 PTO Notice re Third-Party Submission for U.S. Appl. No. 13/772,969.
TW Office Action dated Dec. 30, 2022 in Application No. TW110112565 with English translation.
TW Office Action dated Jan. 31, 2023 in Application No. TW110141329 with English translation.
U.S Advisory Action dated Mar. 9, 2023 in U.S. Appl. No. 16/948,341.
US Corrected Notice of Allowability dated Nov. 1, 2019 in U.S. Appl. No. 15/334,835.
US Corrected Notice of Allowance dated Aug. 19, 2021 in U.S. Appl. No. 16/871,976.
U.S. Final Office Action dated Apr. 5, 2023 in U.S. Appl. No. 17/964,210.
US Final Office Action dated Apr. 30, 2012 in U.S. Appl. No. 13/049,750.
U.S. Final Office Action dated Aug. 19, 2013 in U.S. Appl. No. 13/049,756.
U.S. Final Office Action dated Dec. 15, 2022 in U.S. Appl. No. 16/948,341.
US Final Office Action dated Feb. 26, 2015 in U.S. Appl. No. 13/479,137.
US Final Office Action dated Jan. 11, 2019 in U.S. Appl. No. 15/334,835.
US Final Office Action dated Jan. 27, 2014 in U.S. Appl. No. 13/479,137.
US Final Office Action dated Jul. 1, 2019 in U.S. Appl. No. 15/334,832.
U.S. Final Office Action dated Jul. 2, 2015 in U.S. Appl. No. 13/049,756.
US Final Office Action dated May 15, 2014 in U.S. Appl. No. 13/449,251.
US Final Office Action dated May 16, 2014 in U.S. Appl. No. 13/449,248.
U.S. Non-Final Office Action dated Apr. 12, 2023 in U.S. Appl. No. 17/450,091.
U.S. Non-Final Office Action dated Aug. 16, 2021 in U.S. Appl. No. 16/568,639.
U.S. Non-Final office Action dated Aug. 31, 2022 in U.S. Appl. No. 16/948,341.
U.S. Non-Final Office Action dated Dec. 21, 2022 in U.S. Appl. No. 17/964,210.
U.S. Non-Final office Action dated Dec. 22, 2022 in U.S. Appl. No. 17/538,660.
U.S. Non-Final Office Action dated Jul. 26, 2023, in U.S. Appl. No. 17/964,210.
U.S. Non-Final Office Action dated Nov. 16, 2022, in U.S. Appl. No. 16/949,855.
U.S. Notice of Allowance dated Apr. 7, 2023 in U.S. Appl. No. 17/654,458.
US Notice of Allowance dated Apr. 13, 2015 in U.S. Appl. No. 14/657,380.
U.S. Notice of Allowance dated Apr. 17, 2023 in U.S. Appl. No. 17/538,660.
U.S. Notice of Allowance dated Apr. 26, 2023 in U.S. Appl. No. 17/538,660.
U.S. Notice of Allowance dated Dec. 27, 2021, in U.S. Appl. No. 16/568,639.
US Notice of Allowance dated Jan. 10, 2014 in U.S. Appl. No. 13/449,235.
US Notice of Allowance dated Jan. 22, 2015 in U.S. Appl. No. 13/682,618.
US Notice of Allowance dated Jul. 1, 2020 in U.S. Appl. No. 15/334,832.
US Notice of Allowance dated Jul. 15, 2020 in U.S. Appl. No. 15/882,719.
US Notice of Allowance dated Jul. 15, 2021 in U.S. Appl. No. 16/871,976.
US Notice of Allowance dated Jul. 20, 2012 in U.S. Appl. No. 13/049,623.
U.S. Notice of Allowance dated Jun. 9, 2023 in U.S. Appl. No. 16/949,855.
U.S. Notice of Allowance dated Jun. 14, 2023, in U.S. Appl. No. 16/948,341.
US Notice of Allowance dated Jun. 17, 2014 in U.S. Appl. No. 13/309,990.
US Notice of Allowance dated Jun. 26, 2019 in U.S. Appl. No. 15/334,835.
U.S. Notice of Allowance dated Mar. 2, 2023 in U.S. Appl. No. 17/654,458.
US Notice of Allowance dated May 14, 2015 in U.S. Appl. No. 13/479,137.
US Notice of Allowance dated May 8, 2012 in U.S. Appl. No. 13/049,750.
U.S. Notice of Allowance dated Sep. 7, 2021 in U.S. Appl. No. 16/948,340.
U.S. Notice of Allowance dated Sep. 16, 2021 in U.S. Appl. No. 16/948,340.
US Notice of Allowance (supplemental) dated Jun. 12, 2015 in U.S. Appl. No. 13/479,137.
US Office Action dated Dec. 10, 2020 in U.S. Appl. No. 16/871,976.

(56) References Cited

OTHER PUBLICATIONS

US Office Action dated Dec. 24, 2013 in U.S. Appl. No. 13/309,990.
US Office Action dated Dec. 31, 2018 in U.S. Appl. No. 15/334,832.
US Office Action dated Feb. 21, 2020 in U.S. Appl. No. 15/334,832.
US Office Action dated Feb. 23, 2016 in U.S. Appl. No. 13/449,248.
US Office Action dated Feb. 24, 2015 in U.S. Appl. No. 14/163,026.
US Office Action dated Feb. 3, 2012 in U.S. Appl. No. 13/049,750.
US Office Action dated Jan. 16, 2015 in U.S. Appl. No. 14/468,778.
U.S. Office Action dated Jan. 18, 2013 in U.S. Appl. No. 13/049,756.
US Office Action dated Jul. 3, 2014 in U.S. Appl. No. 13/479,137.
US Office Action dated Jun. 3, 2015 in U.S. Appl. No. 13/449,251.
US Office Action dated Mar. 12, 2020 in U.S. Appl. No. 15/882,719.
US Office Action dated Mar. 15, 2019 in U.S. Appl. No. 15/334,835.
US Office Action dated Mar. 27, 2012 in U.S. Appl. No. 13/049,623.
US Office Action dated Mar. 27, 2018 in U.S. Appl. No. 15/334,835.
US Office Action dated Nov. 12, 2019 in U.S. Appl. No. 15/882,719.
US Office Action dated Nov. 29, 2013 in U.S. Appl. No. 13/449,248.
US Office Action dated Nov. 29, 2013 in U.S. Appl. No. 13/449,251.
US Office Action dated Oct. 11, 2013 in U.S. Appl. No. 13/449,235.
US Office Action dated Oct. 28, 2014 in U.S. Appl. No. 13/449,251.
U.S. Office Action dated Oct. 6, 2014 in U.S. Appl. No. 13/049,756.
US Office Action dated Sep. 15, 2014 in U.S. Appl. No. 13/682,618.
US Office Action dated Sep. 23, 2013 in U.S. Appl. No. 13/479,137.
US Office Action dated Sep. 29, 2014 in U.S. Appl. No. 13/449,248.
U.S. Appl. No. 16/696,887, inventors Brown et al., filed Nov. 26, 2019.
U.S. Appl. No. 63/146,365, inventors Brown et al., filed Feb. 5, 2021.
U.S. Pat. Appl. No. PCT/US2021/017946, filed on Feb. 12, 2021.
U.S. Appl. No. 17/964,210, inventors Brown et al., filed Oct. 12, 2022.
U.S. Appl. No. 18/493,067, inventors Brown S C, et al., filed Oct. 24, 2023.
US PTAB Decision on Appeal dated Feb. 25, 2019 in U.S. Appl. No. 13/449,248.
US PTAB Decision on Appeal dated Feb. 25, 2019 in U.S. Appl. No. 13/449,251.
US Supplemental Notice of Allowability dated Aug. 6, 2020 in U.S. Appl. No. 15/334,832.
U.S Supplementary Notice of Allowability dated Dec. 30, 2021, in U.S. Appl. No. 16/948,340.
Australian Examination Report dated Apr. 16, 2024, in AU Application No. 2023201415.
CN Office Action dated Dec. 28, 2023 in CN Application No. 202110511706.4 with English Translation.
CN Office Action dated May 31, 2024 in CN Application No. 202110511706.4 with English translation.
International Preliminary Report on Patentability and Written Opinion dated Feb. 8, 2024 in PCT Application No. PCT/US2022/074066.
International Search Report and Written Opinion dated Jul. 23, 2024 in PCT Application No. PCT/US2024/012981.
JP Office Action dated Nov. 15, 2022 in Application No. JP2021-207119 awaiting English translation.
KR Office Action dated May 27, 2024 in KR Application No. 10-2018-7014063 with English Translation.
U.S. Notice of Allowance dated Aug. 14, 2024 in U.S. Appl. No. 18/493,067.
U.S. Notice of Allowance dated May 28, 2024 in U.S. Appl. No. 18/493,067.
AU Examination Report dated Oct. 11, 2024, in AU Application No. 20230201415.
CN Notice of Allowances dated Oct. 25, 2024 in CN Application No. 202110511706.4 with English translation.
U.S. Appl. No. 18/816,309, inventors Brown S.C, et al., filed Aug. 27, 2024.

* cited by examiner

CONTROLLER FOR OPTICALLY-SWITCHABLE WINDOWS

PRIORITY DATA AND INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

The entire disclosures of the following are hereby incorporated by reference for all purposes: U.S. patent application Ser. No. 15/882,719, U.S. patent application Ser. No. 13/449,248, U.S. patent application Ser. No. 13/049,756, titled "Multipurpose Controller for Multistate Windows", by Brown et al., filed Mar. 16, 2011, now U.S. Pat. No. 9,454,055, U.S. patent application Ser. No. 13/449,235, titled "Controlling Transitions in Optically Switchable Devices", by Brown et al., filed Apr. 17, 2012, now U.S. Pat. No. 8,705,162, and U.S. patent application Ser. No. 13/449,251, titled "Controller for Optically-Switchable Windows", by Stephen Clark Brown, filed Apr. 17, 2012.

TECHNICAL FIELD

This disclosure relates generally to optically-switchable devices including electrochromic windows, and more particularly to controllers for controlling and driving optically-switchable devices.

DESCRIPTION OF THE RELATED TECHNOLOGY

Optically-switchable devices can be integrated with windows to enable control over, for example, the tinting, transmittance, or reflectance of window panes. Optically-switchable devices include electrochromic devices. Electrochromism is a phenomenon in which a material exhibits a reversible electrochemically-mediated change in one or more optical properties when stimulated to a different electronic state. For example, the electrochromic material can be stimulated by an applied voltage. Optical properties that can be reversibly manipulated include, for example, color, transmittance, absorbance, and reflectance. One well known electrochromic material is tungsten oxide ($WO_3$). Tungsten oxide is a cathodic electrochromic material that undergoes a coloration transition—transparent to blue—by electrochemical action via intercalation of positive ions into the tungsten oxide matrix with concurrent charge balance by electron insertion.

Electrochromic materials and the devices made from them may be incorporated into, for example, windows for home, commercial, or other uses. The color, transmittance, absorbance, or reflectance of such electrochromic windows can be changed by inducing a change in the electrochromic material. For example, electrochromic windows can be darkened or lightened in response to electrical stimulation. For example, a first voltage applied to an electrochromic device of the window may cause the window to darken while a second voltage may cause the window to lighten. This capability can allow for control over the intensities of various wavelengths of light that may pass through the window, including both the light that passes from an outside environment through the window into an inside environment as well as potentially the light that passes from an inside environment through the window out to an outside environment.

Such capabilities of electrochromic windows present enormous opportunities for increasing energy efficiency, as well as for aesthetic purposes. With energy conservation being foremost in the minds of many modern energy policymakers, it is expected that the growth of the electrochromic window industry will be robust. An important consideration in the engineering of electrochromic windows is how best to integrate them into new as well as existing (e.g., retrofit) applications. Of particular importance is how best to organize, control, and deliver power to the electrochromic windows.

SUMMARY

According to one innovative aspect, a window controller includes a command-voltage generator configured to generate a command voltage signal. The window controller also includes a pulse-width-modulated-signal generator configured to generate a pulse-width-modulated signal based on the command voltage signal. The pulse-width-modulated signal is configured to drive an optically-switchable device on a substantially transparent substrate. In some embodiments, the pulse-width-modulated signal comprises a first power component having a first duty cycle and a second power component having a second duty cycle. In some embodiments, the first power component is configured to deliver a first pulse during each active portion of the first duty cycle, and the second power component is configured to deliver a second pulse during each active portion of the second duty cycle. In some embodiments, during operation, the first pulses are applied to a first conductive electrode layer of the optically-switchable device and the second pulses are applied to a second conductive electrode layer of the optically-switchable device. In some embodiments, the relative durations of the active portions of the first and second duty cycles and the relative durations of the first and second pulses are adjusted to result in a change in an effective DC voltage applied across the optically-switchable device.

In some embodiments, the substantially transparent substrate is configured in an IGU. In some embodiments, the window controller is located at least partially within a seal of the IGU. In some embodiments, the optically-switchable device is an electrochromic device formed on a surface of the substantially transparent substrate and adjacent an interior volume of the IGU.

In some embodiments, the first duty cycle has a first time period and a first voltage magnitude, the second duty cycle has a second time period and a second voltage magnitude, the first time period equals the second time period, and the first voltage magnitude equals the second voltage magnitude. In some embodiments, the window controller also includes first and second inductors that couple the first and second power components to the optically-switchable device, the voltage applied across the optically-switchable device resulting from the applied first and second power components is effectively a DC voltage. In some embodiments, the active portion of the first duty cycle comprises a first fraction of the first time period, the active portion of the second duty cycle comprises a second fraction of the second time period, the magnitude of the voltage applied to a first conductive layer of the optically-switchable device is substantially proportional to the product of the first fraction and the first voltage magnitude, the magnitude of the voltage applied to a second conductive layer of the optically-switchable device is substantially proportional to the product of the second fraction and the second voltage magnitude, and the effective DC voltage applied across the optically-switchable device is substantially equal to the difference between the magnitude of the voltage applied to the first conductive layer and the magnitude of the voltage applied to the second conductive layer.

In some embodiments, the command-voltage generator includes a microcontroller configured to generate the command voltage signal. In some embodiments, the microcontroller generates the command voltage signal based at least in part on a voltage feedback signal that is itself based on an effective DC voltage applied across the optically-switchable device. In some embodiments, the microcontroller generates the command voltage signal based at least in part on a current feedback signal that is itself based on a detected current transmitted through the optically-switchable device.

In some embodiments, the window controller also includes a memory device configured to store one or more drive parameters. In some embodiments, the drive parameters include one or more of a current outside temperature, a current inside temperature, a current transmissivity value of the electrochromic device, a target transmissivity value of the electrochromic device, and a transition rate. In some embodiments, the microcontroller is further configured to modify the command voltage signal based on one or more other input, feedback, or control signals. The window controller, wherein the microcontroller modifies the command voltage signal based at least in part on a voltage feedback signal that is itself based on a detected actual level of the effective DC voltage applied across the optically-switchable device.

According to another innovative aspect, a system includes: a plurality of windows, each window including an optically-switchable device on a substantially transparent substrate; a plurality of window controllers such as those just described; and a network controller configured to control the plurality of window controllers. In some embodiments, each window controller is configured to generate a command voltage signal based at least in part and at least at certain times on an input received from the network controller.

In some embodiments, the network controller is configured to communicate with a building management system and the microcontroller of each window controller is configured to modify the command voltage signal based on input from the building management system. In some embodiments, the network controller is configured to communicate with one or more lighting systems, heating systems, cooling systems, ventilation systems, power systems, and/or security systems and the microcontroller of each window controller is configured to modify the command voltage signal based on input from the one or more lighting systems, heating systems, cooling systems, ventilation systems, power systems, and/or security systems.

Details of one or more embodiments or implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following detailed description is directed to certain embodiments or implementations for the purposes of describing the innovative aspects. However, the teachings herein can be applied and implemented in a multitude of different ways. Furthermore, while the disclosed embodiments focus on electrochromic windows (also referred to as smart windows), the concepts disclosed herein may apply to other types of switchable optical devices including, for example, liquid crystal devices and suspended particle devices, among others. For example, a liquid crystal device or a suspended particle device, rather than an electrochromic device, could be incorporated into some or all of the disclosed embodiments.

Figure 1:
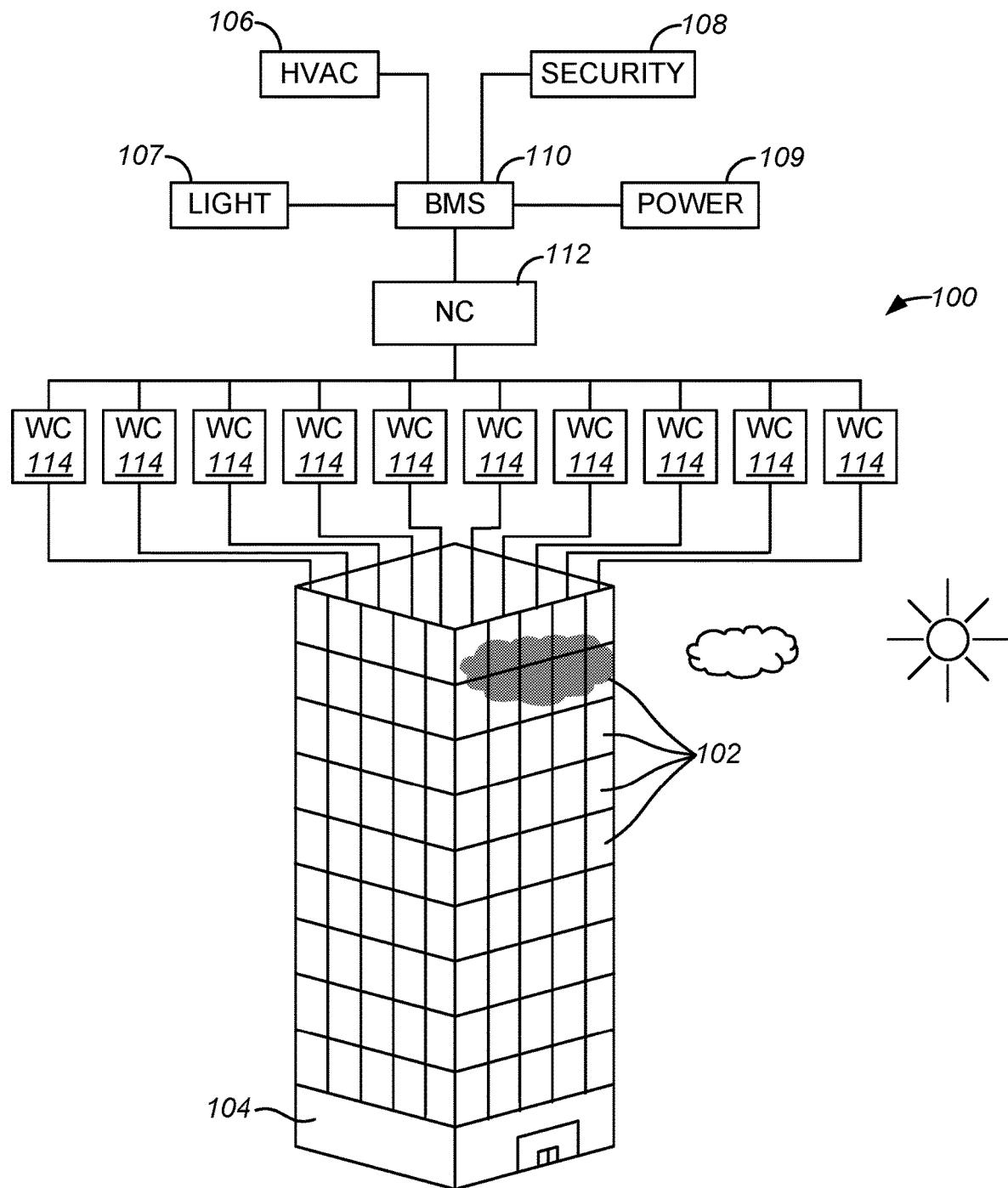
FIG. 1 shows a depiction of a system for controlling and driving a plurality of electrochromic windows.

Referring to FIG. 1 as an example, some embodiments relate to a system, 100, for controlling and driving (e.g., selectively powering) a plurality of electrochromic windows, 102. System 100, adapted for use in a building, 104, is used for controlling and driving a plurality of exterior facing electrochromic windows 102. Some embodiments find particularly advantageous use in buildings such as commercial office buildings or residential buildings. Some embodiments can be particularly suited and adapted for use in the construction of new buildings. For example, some embodiments of system 100 are designed to work in conjunction with modern or novel heating, ventilation, and air conditioning (HVAC) systems, 106, interior lighting systems, 107, security systems, 108, and power systems, 109, as a single holistic efficient energy control system for the entire building 104, or campus of buildings 104. Some embodiments are particularly well-suited for integration with a building management system (BMS), 110. A BMS is a computer-based control system that can be installed in a building to monitor and control the building's mechanical and electrical equipment such as HVAC systems, lighting systems, power systems, elevators, fire systems, and security systems. A BMS consists of hardware and associated firmware or software for maintaining conditions in the building according to preferences set by the occupants or a building manager or other administrator. The software can be based on, for example, internet protocols or open standards.

A BMS is typically used in large buildings, and typically functions at least to control the environment within the building. For example, a BMS may control lighting, temperature, carbon dioxide levels, and humidity within a building. Typically, there are many mechanical or electrical devices that are controlled by a BMS such as, for example, heaters, air conditioners, blowers, and vents. To control the building environment, a BMS may turn on and off these various devices according to pre-defined rules or in response to pre-defined conditions. A core function of a typical modern BMS is to maintain a comfortable environment for the building's occupants while minimizing heating and cooling energy losses and costs. A modern BMS can be used not only to monitor and control, but also to optimize the synergy between various systems, for example, to conserve energy and lower building operation costs.

Some embodiments are alternatively or additionally designed to work responsively or reactively based on feedback sensed through, for example, thermal, optical, or other sensors or through input from, for example, an HVAC or interior lighting system, or an input from a user control. Some embodiments also can be utilized in existing structures, including both commercial and residential structures, having traditional or conventional HVAC or interior lighting systems. Some embodiments also can be retrofitted for use in older residential homes.

In some embodiments, system 100 includes a network controller, 112. In some embodiments, network controller 112 controls a plurality of window controllers, 114. For example, network controller 112 can control tens, hundreds, or even thousands of window controllers 114. Each window controller 114, in turn, can control and drive one or more electrochromic windows 102. The number and size of the electrochromic windows 102 that each window controller 114 can drive is generally limited by the voltage and current characteristics of the load on the window controller 114 controlling the respective electrochromic windows 102. In some embodiments, the maximum window size that each window controller 114 can drive is limited by the voltage, current, or power requirements to cause the desired optical transitions in the electrochromic window 102 within a desired time-frame. Such requirements are, in turn, a function of the surface area of the window. In some embodiments, this relationship is nonlinear. For example, the voltage, current, or power requirements can increase nonlinearly with the surface area of the electrochromic window 102. For example, in some cases the relationship is nonlinear at least in part because the sheet resistance of the first and second conductive layers 230 and 238 (see FIG. 2) increases nonlinearly with distance across the length and width of the first or second conductive layers. In some embodiments, the relationship between the voltage, current, or power requirements required to drive multiple electrochromic windows 102 of equal size and shape is, however, directly proportional to the number of the electrochromic windows 102 being driven.

In the following description, each electrochromic window 102 will be referred to as an insulated glass unit (IGU) 102. This convention is assumed, for example, because it is common and can be desirable to have IGUs serve as the fundamental construct for holding an electrochromic lite or pane. Additionally, IGUs, especially those having double or triple pane window configurations, offer superior thermal insulation over single pane configurations. However, this convention is for convenience only because, as described below, in many implementations the basic unit of an electrochromic window can be considered to include a pane or substrate of transparent material, upon which an electrochromic coating or device is deposited, and to which associated electrical connections are coupled to power the electrochromic coating or device.

Figure 2:
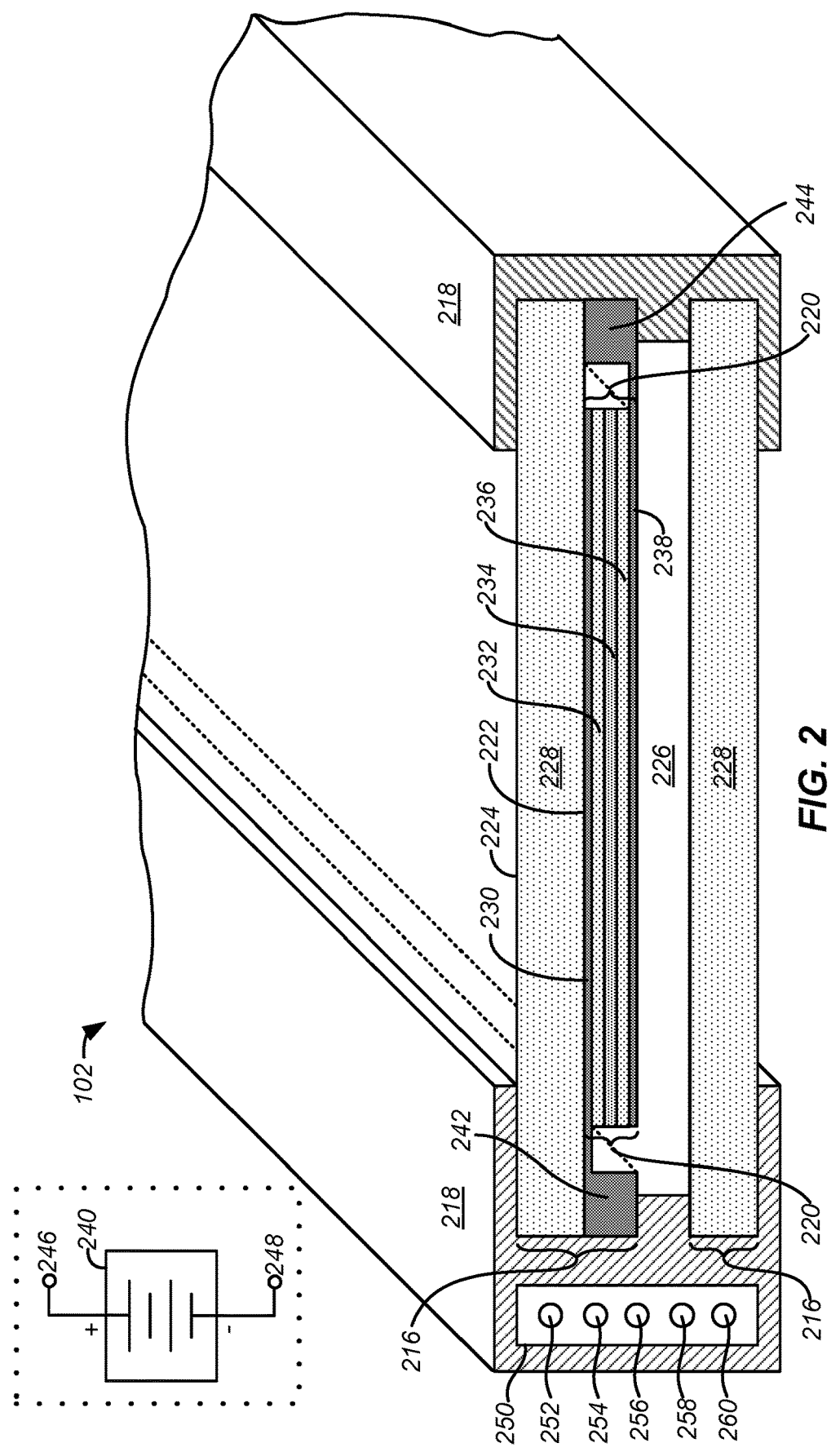
FIG. 2 shows a cross-sectional axonometric view of an example electrochromic window that includes two window panes.

FIG. 2 shows a cross-sectional axonometric view of an embodiment of an IGU 102 that includes two window panes, 216. In various embodiments, each IGU 102 can include one, two, or more substantially transparent (e.g., at no applied voltage) window panes 216 as well as a frame, 218, that supports the panes 216. For example, the IGU 102 shown in FIG. 2 is configured as a double-pane window. One or more of the panes 216 can itself be a laminate structure of two, three, or more layers or panes (e.g., shatter-resistant glass similar to automotive windshield glass). In each IGU 102, at least one of the panes 216 includes an electrochromic device or stack, 220, disposed on at least one of its inner surface, 222, or outer surface, 224: for example, the inner surface 222 of the outer pane 216.

In multi-pane configurations, each adjacent set of panes 216 can have a volume, 226, disposed between them. Generally, each of the panes 216 and the IGU 102 as a whole are rectangular and form a rectangular solid. However, in other embodiments other shapes (e.g., circular, elliptical, triangular, curvilinear, convex, concave) may be desired. In some embodiments, the volume 226 between the panes 116 is evacuated of air. In some embodiments, the IGU 102 is hermetically-sealed. Additionally, the volume 226 can be filled (to an appropriate pressure) with one or more gases, such as argon (Ar), krypton (Kr), or xenon (Xn), for example. Filling the volume 226 with a gas such as Ar, Kr, or Xn can reduce conductive heat transfer through the IGU 102 because of the low thermal conductivity of these gases. The latter two gases also can impart improved acoustic insulation due to their increased weight.

In some embodiments, frame 218 is constructed of one or more pieces. For example, frame 218 can be constructed of one or more materials such as vinyl, PVC, aluminum (Al), steel, or fiberglass. The frame 218 may also include or hold one or more foam or other material pieces that work in conjunction with frame 218 to separate the window panes 216 and to hermetically seal the volume 226 between the panes 216. For example, in a typical IGU implementation, a spacer lies between adjacent panes 216 and forms a hermetic seal with the panes in conjunction with an adhesive sealant that can be deposited between them. This is termed the primary seal, around which can be fabricated a secondary seal, typically of an additional adhesive sealant. In some such embodiments, frame 218 can be a separate structure that supports the IGU construct.

Each pane 216 includes a substantially transparent or translucent substrate, 228. Generally, substrate 228 has a first (e.g., inner) surface 222 and a second (e.g., outer) surface 224 opposite the first surface 222. In some embodiments, substrate 228 can be a glass substrate. For example, substrate 228 can be a conventional silicon oxide ($SO_x$)-based glass substrate such as soda-lime glass or float glass, composed of, for example, approximately 75% silica ($SiO_2$) plus $Na_2O$, CaO, and several minor additives. However, any material having suitable optical, electrical, thermal, and mechanical properties may be used as substrate 228. Such substrates also can include, for example, other glass materials, plastics and thermoplastics (e.g., poly(methyl methacrylate), polystyrene, polycarbonate, allyl diglycol carbonate, SAN (styrene acrylonitrile copolymer), poly(4-methyl-1-pentene), polyester, polyamide), or mirror materials. If the substrate is formed from, for example, glass, then substrate 228 can be strengthened, e.g., by tempering, heating, or chemically strengthening. In other implementations, the substrate 228 is not further strengthened, e.g., the substrate is untempered.

In some embodiments, substrate 228 is a glass pane sized for residential or commercial window applications. The size of such a glass pane can vary widely depending on the specific needs of the residence or commercial enterprise. In some embodiments, substrate 228 can be formed of architectural glass. Architectural glass is typically used in commercial buildings, but also can be used in residential buildings, and typically, though not necessarily, separates an indoor environment from an outdoor environment. In certain embodiments, a suitable architectural glass substrate can be at least approximately 20 inches by approximately 20 inches, and can be much larger, for example, approximately 80 inches by approximately 120 inches, or larger. Architectural glass is typically at least about 2 millimeters (mm) thick and may be as thick as 6 mm or more. Of course, electrochromic devices 220 can be scalable to substrates 228 smaller or larger than architectural glass, including in any or all of the respective length, width, or thickness dimensions. In some embodiments, substrate 228 has a thickness in the range of approximately 1 mm to approximately 10 mm.

Electrochromic device 220 is disposed over, for example, the inner surface 222 of substrate 228 of the outer pane 216 (the pane adjacent the outside environment). In some other embodiments, such as in cooler climates or applications in which the IGUs 102 receive greater amounts of direct sunlight (e.g., perpendicular to the surface of electrochromic device 220), it may be advantageous for electrochromic device 220 to be disposed over, for example, the inner surface (the surface bordering the volume 226) of the inner pane adjacent the interior environment. In some embodiments, electrochromic device 220 includes a first conductive layer (CL) 230, an electrochromic layer (EC) 232, an ion conducting layer (IC) 234, a counter electrode layer (CE) 236, and a second conductive layer (CL) 238. Again, layers 230, 232, 234, 236, and 238 are also collectively referred to as electrochromic stack 220. A power source 240 operable to apply an electric potential across a thickness of electrochromic stack 220 effects the transition of the electrochromic device 220 from, for example, a bleached or lighter state (e.g., a transparent, semitransparent, or translucent state) to a colored or darker state (e.g., a tinted, less transparent or less translucent state). In some other embodiments, the order of layers 230, 232, 234, 236, and 238 can be reversed or otherwise reordered or rearranged with respect to substrate 238.

In some embodiments, one or both of first conductive layer 230 and second conductive layer 238 is formed from an inorganic and solid material. For example, first conductive layer 230, as well as second conductive layer 238, can be made from a number of different materials, including conductive oxides, thin metallic coatings, conductive metal nitrides, and composite conductors, among other suitable materials. In some embodiments, conductive layers 230 and 238 are substantially transparent at least in the range of wavelengths where electrochromism is exhibited by the electrochromic layer 232. Transparent conductive oxides include metal oxides and metal oxides doped with one or more metals. For example, metal oxides and doped metal oxides suitable for use as first or second conductive layers 230 and 238 can include indium oxide, indium tin oxide (ITO), doped indium oxide, tin oxide, doped tin oxide, zinc oxide, aluminum zinc oxide, doped zinc oxide, ruthenium oxide, doped ruthenium oxide, among others. First and second conductive layers 230 and 238 also can be referred to as "transparent conductive oxide" (TCO) layers.

In some embodiments, commercially available substrates, such as glass substrates, already contain a transparent conductive layer coating when purchased. In some embodiments, such a product can be used for both substrate 238 and conductive layer 230 collectively. Examples of such glass substrates include conductive layer-coated glasses sold under the trademark TEC Glass™ by Pilkington, of Toledo, Ohio and SUNGATE™ 300 and SUNGATE™ 500 by PPG Industries of Pittsburgh, Pennsylvania. Specifically, TEC Glass™ is, for example, a glass coated with a fluorinated tin oxide conductive layer.

In some embodiments, first or second conductive layers 230 and 238 can each be deposited by physical vapor deposition processes including, for example, sputtering. In some embodiments, first and second conductive layers 230 and 238 can each have a thickness in the range of approximately 0.01 µm to approximately 1 µm. In some embodiments, it may be generally desirable for the thicknesses of the first and second conductive layers 230 and 238 as well as the thicknesses of any or all of the other layers described below to be individually uniform with respect to the given layer; that is, that the thickness of a given layer is uniform and the surfaces of the layer are smooth and substantially free of defects or other ion traps.

A primary function of the first and second conductive layers 230 and 238 is to spread an electric potential provided by a power source 240, such as a voltage or current source, over surfaces of the electrochromic stack 220 from outer surface regions of the stack to inner surface regions of the stack, with relatively little Ohmic potential drop from the outer regions to the inner regions (e.g., as a result of a sheet resistance of the first and second conductive layers 230 and 238). In other words, it can be desirable to create conductive layers 230 and 238 that are each capable of behaving as substantially equipotential layers across all portions of the respective conductive layer along the length and width of the electrochromic device 220. In some embodiments, bus bars 242 and 244, one (e.g., bus bar 242) in contact with conductive layer 230 and one (e.g., bus bar 244) in contact with conductive layer 238 provide electric connection between the voltage or current source 240 and the conductive layers 230 and 238. For example, bus bar 242 can be electrically coupled with a first (e.g., positive) terminal 246 of power source 240 while bus bar 244 can be electrically coupled with a second (e.g., negative) terminal 248 of power source 240.

In some embodiments, IGU 102 includes a plug-in component 250. In some embodiments, plug-in component 250 includes a first electrical input 252 (e.g., a pin, socket, or other electrical connector or conductor) that is electrically coupled with power source terminal 246 via, for example, one or more wires or other electrical connections, components, or devices. Similarly, plug-in component 250 can include a second electrical input 254 that is electrically coupled with power source terminal 248 via, for example, one or more wires or other electrical connections, components, or devices. In some embodiments, first electrical input 252 can be electrically coupled with bus bar 242, and from there with first conductive layer 230, while second electrical input 254 can be coupled with bus bar 244, and from there with second conductive layer 238. The conductive layers 230 and 238 also can be connected to power source 240 with other conventional means as well as according to other means described below with respect to window controller 114. For example, as described below with reference to FIG. 4, first electrical input 252 can be connected to a first power line while second electrical input 254 can be connected to a second power line. Additionally, in some embodiments, third electrical input 256 can be coupled to a device, system, or building ground. Furthermore, in some embodiments, fourth and fifth electrical inputs/outputs 258 and 260, respectively, can be used for communication between, for example, window controller 114, or microcontroller 274, and network controller 112, as described below.

In some embodiments, electrochromic layer 232 is deposited or otherwise formed over first conductive layer 230. In some embodiments, electrochromic layer 232 is formed of an inorganic and solid material. In various embodiments, electrochromic layer 232 can include or be formed of one or more of a number of electrochromic materials, including electrochemically cathodic or electrochemically anodic materials. For example, metal oxides suitable for use as electrochromic layer 232 can include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), and cobalt oxide ($Co_2O_3$), among other materials. In some embodiments, electrochromic layer 232 can have a thickness in the range of approximately 0.05 μm to approximately 1 μm.

During operation, in response to a voltage generated across the thickness of electrochromic layer 232 by first and second conductive layers 230 and 238, electrochromic layer 232 transfers or exchanges ions to or from counter electrode layer 236 resulting in the desired optical transitions in electrochromic layer 232, and in some embodiments, also resulting in an optical transition in counter electrode layer 236. In some embodiments, the choice of appropriate electrochromic and counter electrode materials governs the relevant optical transitions.

In some embodiments, counter electrode layer 236 is formed of an inorganic and solid material. Counter electrode layer 236 can generally include one or more of a number of materials or material layers that can serve as a reservoir of ions when the electrochromic device 220 is in, for example, the transparent state. For example, suitable materials for the counter electrode layer 236 include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue. In some embodiments, counter electrode layer 236 can have a thickness in the range of approximately 0.05 μm to approximately 1 μm. In some embodiments, counter electrode layer 236 is a second electrochromic layer of opposite polarity as electrochromic layer 232. For example, when electrochromic layer 232 is formed from an electrochemically cathodic material, counter electrode layer 236 can be formed of an electrochemically anodic material.

During an electrochromic transition initiated by, for example, application of an appropriate electric potential across a thickness of electrochromic stack 220, counter electrode layer 236 transfers all or a portion of the ions it holds to electrochromic layer 232, causing the optical transition in the electrochromic layer 232. In some embodiments, as for example in the case of a counter electrode layer 236 formed from NiWO, the counter electrode layer 236 also optically transitions with the loss of ions it has transferred to the electrochromic layer 232. When charge is removed from a counter electrode layer 236 made of NiWO (e.g., ions are transported from the counter electrode layer 236 to the electrochromic layer 232), the counter electrode layer 236 will transition in the opposite direction (e.g., from a transparent state to a darkened state).

In some embodiments, ion conducting layer 234 serves as a medium through which ions are transported (e.g., in the manner of an electrolyte) when the electrochromic device 220 transitions between optical states. In some embodiments, ion conducting layer 234 is highly conductive to the relevant ions for the electrochromic and the counter electrode layers 232 and 236, but also has sufficiently low electron conductivity such that negligible electron transfer occurs during normal operation. A thin ion conducting layer 234 with high ionic conductivity permits fast ion conduction and hence fast switching for high performance electrochromic devices 220. In some embodiments, ion conducting layer 234 can have a thickness in the range of approximately 0.01 μm to approximately 1 μm.

In some embodiments, ion conducting layer 234 also is inorganic and solid. For example, ion conducting layer 234 can be formed from one or more silicates, silicon oxides, tungsten oxides, tantalum oxides, niobium oxides, and borates. The silicon oxides include silicon-aluminum-oxide. These materials also can be doped with different dopants, including lithium. Lithium-doped silicon oxides include lithium silicon-aluminum-oxide.

In some other embodiments, the electrochromic and the counter electrode layers 232 and 236 are formed immediately adjacent one another, sometimes in direct contact, without separately depositing an ion conducting layer. For example, in some embodiments, electrochromic devices having an interfacial region between first and second conductive electrode layers rather than a distinct ion conducting layer 234 can be utilized. Such devices, and methods of fabricating them, are described in U.S. patent application Ser. Nos. 12/772,055 and 12/772,075, each filed 30 Apr. 2010, and in U.S. patent application Ser. Nos. 12/814,277 and 12/814,279, each filed 11 Jun. 2010, all four of which are titled ELECTROCHROMIC DEVICES and name Zhongchun Wang et al. as inventors. Each of these four applications is incorporated by reference herein in its entirety.

In some embodiments, electrochromic device 220 also can include one or more additional layers (not shown), such as one or more passive layers. For example, passive layers used to improve certain optical properties can be included in or on electrochromic device 220. Passive layers for providing moisture or scratch resistance also can be included in electrochromic device 220. For example, the conductive layers 230 and 238 can be treated with anti-reflective or protective oxide or nitride layers. Other passive layers can serve to hermetically seal the electrochromic device 220.

Additionally, in some embodiments, one or more of the layers in electrochromic stack 220 can contain some amount of organic material. Additionally or alternatively, in some embodiments, one or more of the layers in electrochromic stack 220 can contain some amount of liquids in one or more layers. Additionally or alternatively, in some embodiments, solid state material can be deposited or otherwise formed by processes employing liquid components such as certain processes employing sol-gels or chemical vapor deposition.

Additionally, transitions between a bleached or transparent state and a colored or opaque state are but one example, among many, of an optical or electrochromic transition that can be implemented. Unless otherwise specified herein (including the foregoing discussion), whenever reference is made to a bleached-to-opaque transition (or to and from intermediate states in between), the corresponding device or process described encompasses other optical state transitions such as, for example, intermediate state transitions such as percent transmission (% T) to % T transitions, non-reflective to reflective transitions (or to and from intermediate states in between), bleached to colored transitions (or to and from intermediate states in between), and color to color transitions (or to and from intermediate states in between). Further, the term "bleached" may refer to an optically neutral state, for example, uncolored, transparent or translucent. Still further, unless specified otherwise herein, the "color" of an electrochromic transition is not limited to any particular wavelength or range of wavelengths.

Generally, the colorization or other optical transition of the electrochromic material in electrochromic layer 232 is caused by reversible ion insertion into the material (for example, intercalation) and a corresponding injection of charge-balancing electrons. Typically, some fraction of the ions responsible for the optical transition is irreversibly bound up in the electrochromic material. Some or all of the irreversibly bound ions can be used to compensate "blind charge" in the material. In some embodiments, suitable ions include lithium ions (Li+) and hydrogen ions (H+) (i.e., protons). In some other embodiments, however, other ions can be suitable. Intercalation of lithium ions, for example, into tungsten oxide ($WO_{3-y}$ ($0<y\leq\sim 0.3$)) causes the tungsten oxide to change from a transparent (e.g., bleached) state to a blue (e.g., colored) state.

In particular embodiments described herein, the electrochromic device 220 reversibly cycles between a transparent state and an opaque or tinted state. In some embodiments, when the device is in a transparent state, a potential is applied to the electrochromic stack 220 such that available ions in the stack reside primarily in the counter electrode layer 236. When the magnitude of the potential on the electrochromic stack 220 is reduced or its polarity reversed, ions are transported back across the ion conducting layer 234 to the electrochromic layer 232 causing the electrochromic material to transition to an opaque, tinted, or darker state. In certain embodiments, layers 232 and 236 are complementary coloring layers; that is, for example, when ions are transferred into the counter electrode layer it is not colored. Similarly, when or after the ions are transferred out of the electrochromic layer it is also not colored. But when the polarity is switched, or the potential reduced, however, and the ions are transferred from the counter electrode layer into the electrochromic layer, both the counter electrode and the electrochromic layers become colored.

In some other embodiments, when the device is in an opaque state, a potential is applied to the electrochromic stack 220 such that available ions in the stack reside primarily in the counter electrode layer 236. In such embodiments, when the magnitude of the potential on the electrochromic stack 220 is reduced or its polarity reversed, ions are transported back across the ion conducting layer 234 to the electrochromic layer 232 causing the electrochromic material to transition to a transparent or lighter state. These layers may also be complementary coloring.

Figure 3:
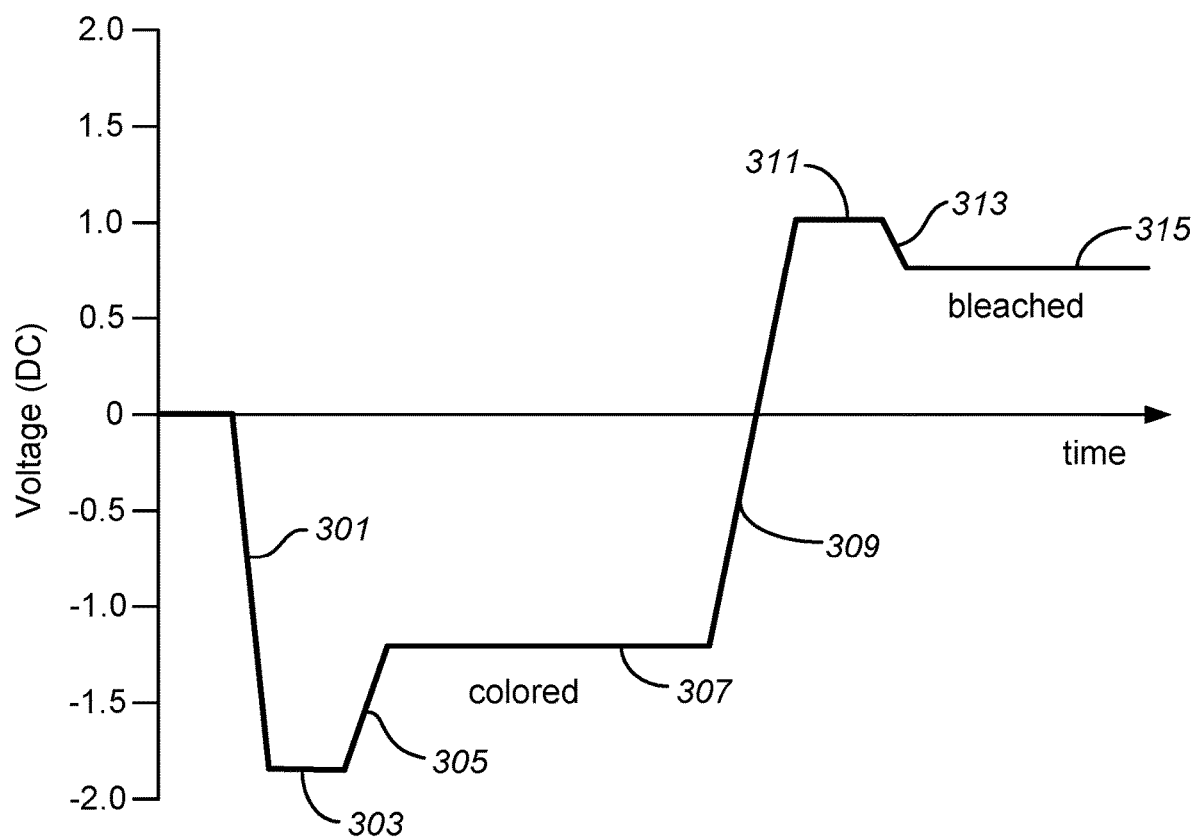
FIG. 3 shows an example of a voltage profile for driving an optical state transition in an electrochromic device.

FIG. 3 shows an example of a voltage profile for driving an optical state transition in an electrochromic device (e.g., electrochromic device 220). The magnitude of the DC voltages (e.g., supplied by power source 240) applied to an electrochromic device 220 may depend in part on the thickness of the electrochromic stack and the size (e.g., surface area) of the electrochromic device 220. A voltage profile 300 can include the following sequence of applied voltage or current parameters for driving electrochromic device 220 from a first state to a colored state, and from a colored state to a bleached state: a negative ramp 301, a negative hold 303, a positive ramp 305, a negative hold 307, a positive ramp 309, a positive hold 311, a negative ramp 313, and a positive hold 315. In some embodiments, the voltage remains constant during the length of time that the device remains in its defined optical state, e.g., in negative hold 307 or positive hold 315. Negative ramp 301 drives the device to the colored or opaque state (or an intermediate partially transparent state) and negative hold 307 maintains the device in the transitioned-to state for a desired period of time. In some embodiments, negative hold 303 may be applied for a specified duration of time or until another condition is met, such as a desired amount of ionic charge being passed sufficient to cause the desired change in coloration, for example. Positive ramp 305, increases the voltage from the maximum magnitude negative voltage (e.g., negative hold 303) to the smaller magnitude negative voltage (e.g., negative hold 307) used to hold the desired optical state. By performing a first negative ramp 301 (and a first negative hold voltage 303 at this peak negative voltage) to "overdrive" electrochromic device 220, the inertia of the ions is overcome more rapidly and the desired target optical state is reached sooner. The second negative hold voltage 307 effectively serves to counteract the voltage drop that would otherwise result from the leakage current. As the leakage current is reduced for any given electrochromic device 220, the hold voltage required to hold the desired optical transition can approach zero.

In some embodiments, positive ramp 309 drives the transition of the electrochromic device from the colored or opaque state (or an intermediate less transparent state) to the bleached or transparent state (or an intermediate more transparent state). Positive hold 315 maintains the device in the transitioned-to state for a desired period of time. In some embodiments, positive hold 311 may be applied for a specified duration of time or until another condition is met, such as a desired amount of ionic charge being passed sufficient to cause the desired change in coloration, for example. Negative ramp 313, decreases the voltage from the maximum magnitude positive voltage (e.g., positive hold 311) to the smaller magnitude positive voltage (e.g., positive hold 315) used to hold the desired optical state. By performing a first positive ramp 309 (and a first positive hold voltage 311 at this peak positive voltage) to "overdrive" electrochromic device 220, the inertia of the ions is overcome more rapidly and the desired target optical state is reached sooner. The second positive hold voltage 315 effectively serves to counteract the voltage drop that would otherwise result from the leakage current. As the leakage current is reduced for any given electrochromic device 220, the hold voltage required to hold the desired optical transition can approach zero.

The rate of the optical transition can be a function of not only the applied voltage, but also the temperature and the voltage ramping rate. For example, since both voltage and temperature affect lithium ion diffusion, the amount of charge passed (and hence the intensity of the ionic current peak) increases with voltage and temperature. Additionally, because voltage and temperature are interdependent, this implies that a lower voltage can be used at higher temperatures to attain the same transition rate as a higher voltage at lower temperatures. This temperature response can be exploited in a voltage-based switching algorithm as described below. The temperature is used to determine which voltage to apply in order to effect rapid transitioning without damaging the device.

In some embodiments, electrical input 252 and electrical input 254 receive, carry, or transmit complementary power signals. In some embodiments, electrical input 252 and its complement electrical input 254 can be directly connected to the bus bars 242 and 244, respectively, and on the other side, to an external power source that provides a variable DC voltage (e.g., sign and magnitude). The external power source can be window controller 114 itself, or power from building 104 transmitted to window controller 114 or otherwise coupled to electrical inputs 252 and 254. In such an embodiment, the electrical signals transmitted through electrical inputs/outputs 258 and 260 can be directly connected to memory device 292, described below, to allow communication between window controller 114 and memory device 292. Furthermore, in such an embodiment, the electrical signal input to electrical input 256 can be internally connected or coupled (within IGU 102) to either electrical input 252 or 254 or to the bus bars 242 or 244 in such a way as to enable the electrical potential of one or more of those elements to be remotely measured (sensed). This can allow window controller 114 to compensate for a voltage drop on the connecting wires from the window controller 114 to the electrochromic device 220.

In some embodiments, the window controller 114 can be immediately attached (e.g., external to the IGU 102 but inseparable by the user) or integrated within the IGU 102. For example, U.S. patent application Ser. No. 13/049,750 naming Brown et al. as inventors, titled ONBOARD CONTROLLER FOR MULTISTATE WINDOWS and filed 16 Mar. 2011, incorporated by reference herein, describes in detail various embodiments of an "onboard" controller. In such an embodiment, electrical input 252 can be connected to the positive output of an external DC power source. Similarly, electrical input 254 can be connected to the negative output of the DC power source. As described below, however, electrical inputs 252 and 254 can, alternately, be connected to the outputs of an external low voltage AC power source (e.g., a typical 24 V AC transformer common to the HVAC industry). In such an embodiment, electrical inputs/outputs 258 and 260 can be connected to the communication bus between window controller 114 and the network controller 112 as described below. In this embodiment, electrical input/output 256 can be eventually (e.g., at the power source) connected with the earth ground (e.g., Protective Earth, or PE in Europe) terminal of the system.

As just described, although the voltages plotted in FIG. 3 are expressed as DC voltages, in some embodiments, the voltages actually supplied by the external power source are AC voltage signals, In some other embodiments, the supplied voltage signals are converted to pulse-width modulated voltage signals. However, as described below with reference to FIG. 4, the voltages actually "seen" or applied to the bus bars 242 and 244 are effectively DC voltages. The frequency of the oscillations of the applied voltage signal can depend on various factors including the leakage current of the electrochromic device 220, the sheet resistance of the conductive layers 230 and 238, the desired end or target state (e.g., % T), or a critical length of a part (e.g., the distance between bus bars 242 and 244). Typically, the voltage oscillations applied at terminals 246 and 248 are in the range of approximately 1 Hz to 1 MHz, and in particular embodiments, approximately 100 kHz. The amplitude of the oscillations also can depend on numerous factors including the desired level of the desired intermediate target state. However, in some example applications, the amplitude of the applied voltage oscillations can be in the range of approximately 0 volts (V) to 24 V while, as described below, the amplitude of the DC voltage actually applied to bus bars 242 and 244 can be in the range of approximately 0.01 V and 10 V, and in some applications, in the range of approximately 0.5 V and 3 V. In various embodiments, the oscillations have asymmetric residence times for the darkening (e.g., tinting) and lightening (e.g., bleaching) portions of a period. For example, in some embodiments, transitioning from a first less transparent state to a second more transparent state requires more time than the reverse; that is, transitioning from the more transparent second state to the less transparent first state. As will be described below, a controller can be designed or configured to apply a driving voltage meeting these requirements.

The oscillatory applied voltage control allows the electrochromic device 220 to operate in, and transition to and from, one or more intermediate states without any necessary modification to the electrochromic device stack 220 or to the transitioning time. Rather, window controller 114 can be configured or designed to provide an oscillating drive voltage of appropriate wave profile, taking into account such factors as frequency, duty cycle, mean voltage, amplitude, among other possible suitable or appropriate factors. Additionally, such a level of control permits the transitioning to any intermediate state over the full range of optical states between the two end states. For example, an appropriately configured controller can provide a continuous range of transmissivity (% T) which can be tuned to any value between end states (e.g., opaque and bleached end states).

To drive the device to an intermediate state using the oscillatory driving voltage, as described above, a controller could simply apply the appropriate intermediate voltage. However, there are more efficient ways to reach the intermediate optical state. This is partly because high driving voltages can be applied to reach the end states but are traditionally not applied to reach an intermediate state. One technique for increasing the rate at which the electrochromic device 220 reaches a desired intermediate state is to first apply a high voltage pulse suitable for full transition (to an end state) and then back off to the voltage of the oscillating intermediate state (just described). Stated another way, an initial low frequency single pulse (low in comparison to the frequency employed to maintain the intermediate state) of magnitude and duration chosen for the intended final state can be employed to speed the transition. After this initial pulse, a higher frequency voltage oscillation can be employed to sustain the intermediate state for as long as desired.

As described above, in some particular embodiments, each IGU 102 includes a plug-in component 250 that in some embodiments is "pluggable" or readily-removable from IGU 102 (e.g., for ease of maintenance, manufacture, or replacement). In some particular embodiments, each plug-in component 250 itself includes a window controller 114. That is, in some such embodiments, each electrochromic device 220 is controlled by its own respective local window controller 114 located within plug-in component 250. In some other embodiments, window controller 114 is integrated with another portion of frame 218, between the glass panes in the secondary seal area, or within volume 226. In some other embodiments, window controller 114 can be located external to IGU 102. In various embodiments, each window controller 114 can communicate with the IGUs 102 it controls and drives, as well as communicate to other window controllers 114, network controller 112, BMS 110, or other servers, systems, or devices (e.g., sensors), via one or more wired (e.g., Ethernet) networks or wireless (e.g., WiFi) networks, for example, via wired (e.g., Ethernet) interface 263 or wireless (WiFi) interface 265. Embodiments having Ethernet or Wifi capabilities are also well-suited for use in residential homes and other smaller-scale non-commercial applications. Additionally, the communication can be direct or indirect, e.g., via an intermediate node between a master controller such as network controller 112 and the IGU 102.

Figure 4:
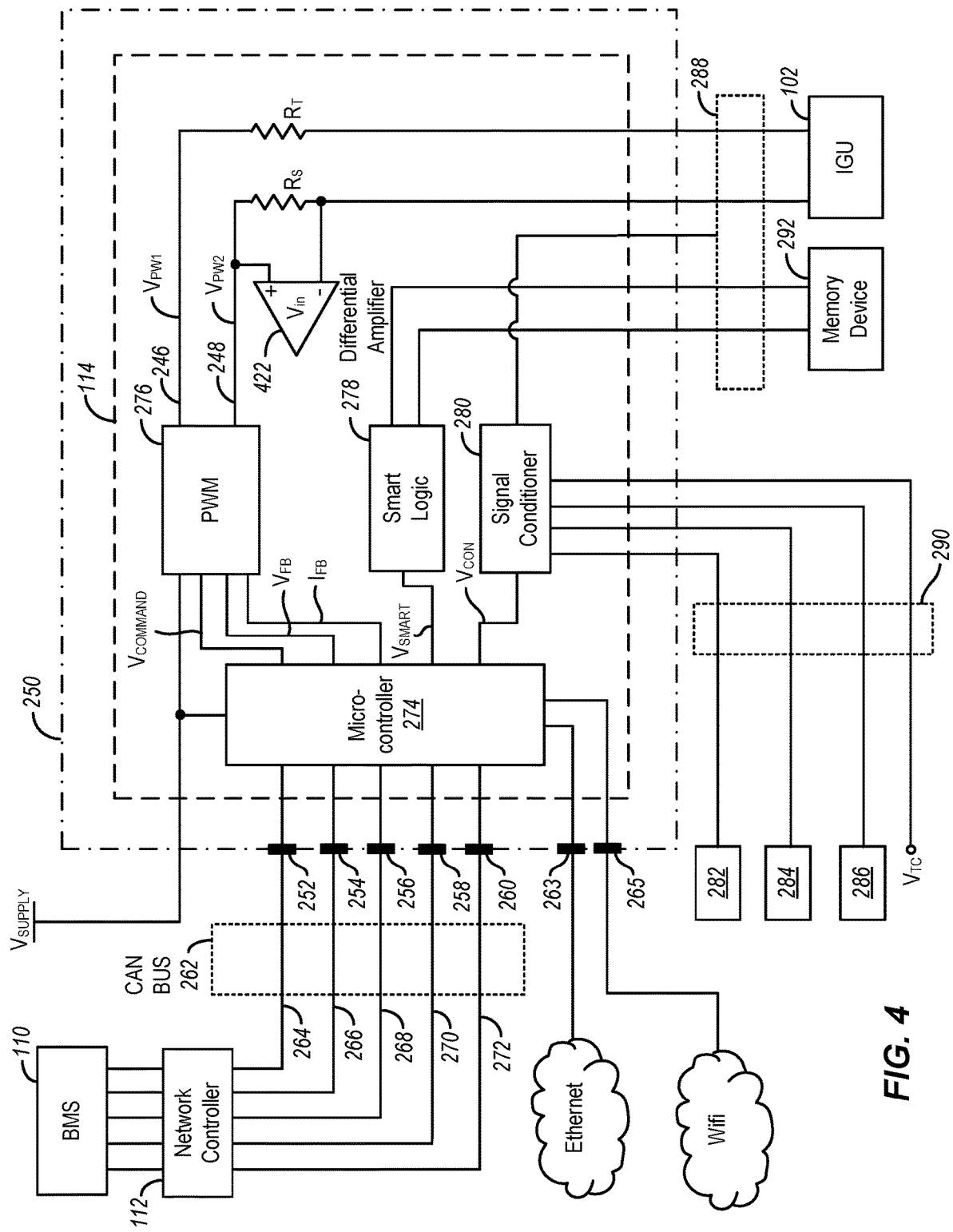
FIG. 4 shows a depiction of an example plug-in component including a window controller.

FIG. 4 shows a depiction of an example plug-in component 250 including a window controller 114. In some embodiments, window controller 114 communicates with network controller 112 over a communication bus 262. For example, communication bus 262 can be designed according to the Controller Area Network (CAN) vehicle bus standard. In such embodiments, first electrical input 252 can be connected to a first power line 264 while second electrical input 254 can be connected to a second power line 266. In some embodiments, as described above, the power signals sent over power lines 264 and 266 are complementary; that is, collectively they represent a differential signal (e.g., a differential voltage signal). In some embodiments, line 268 is coupled to a system or building ground (e.g., an Earth Ground). In such embodiments, communication over CAN bus 262 (e.g., between microcontroller 274 and network controller 112) may proceed along first and second communication lines 270 and 272 transmitted through electrical inputs/outputs 258 and 260, respectively, according to the CANopen communication protocol or other suitable open, proprietary, or overlying communication protocol. In some embodiments, the communication signals sent over communication lines 270 and 272 are complementary; that is, collectively they represent a differential signal (e.g., a differential voltage signal).

In some embodiments, plug-in component 250 couples CAN communication bus 262 into window controller 114, and in particular embodiments, into microcontroller 274. In some such embodiments, microcontroller 274 is also configured to implement the CANopen communication protocol. Microcontroller 274 is also designed or configured (e.g., programmed) to implement one or more drive control algorithms in conjunction with pulse-width modulated amplifier or pulse-width modulator (PWM) 276, smart logic 278, and signal conditioner 280. In some embodiments, microcontroller 274 is configured to generate a command signal $V_{COMMAND}$, e.g., in the form of a voltage signal, that is then transmitted to PWM 276. PWM 276, in turn, generates a pulse-width modulated power signal, including first (e.g., positive) component $V_{PW1}$ and second (e.g., negative) component $V_{PW2}$, based on $V_{COMMAND}$. Power signals $V_{PW1}$ and $V_{PW2}$ are then transmitted over, for example, interface 288, to IGU 102, or more particularly, to bus bars 242 and 244 in order to cause the desired optical transitions in electrochromic device 220. In some embodiments, PWM 276 is configured to modify the duty cycle of the pulse-width modulated signals such that the durations of the pulses in signals $V_{PW1}$ and $V_{PW2}$ are not equal: for example, PWM 276 pulses $V_{PW1}$ with a first 60% duty cycle and pulses $V_{PW2}$ for a second 40% duty cycle. The duration of the first duty cycle and the duration of the second duty cycle collectively represent the duration, $t_{PWM}$ of each power cycle. In some embodiments, PWM 276 can additionally or alternatively modify the magnitudes of the signal pulses $V_{PW1}$ and $V_{PW2}$.

In some embodiments, microcontroller 274 is configured to generate $V_{COMMAND}$ based on one or more factors or signals such as, for example, any of the signals received over CAN bus 262 as well as voltage or current feedback signals, $V_{FB}$ and $I_{FB}$ respectively, generated by PWM 276. In some embodiments, microcontroller 274 determines current or voltage levels in the electrochromic device 220 based on feedback signals $I_{FB}$ or $V_{FB}$, respectively, and adjusts $V_{COMMAND}$ according to one or more rules or algorithms to effect a change in the relative pulse durations (e.g., the relative durations of the first and second duty cycles) or amplitudes of power signals $V_{PW1}$ and $V_{PW2}$ to produce the voltage profiles described above with respect to FIG. 3. Additionally or alternatively, microcontroller 274 can also adjust $V_{COMMAND}$ in response to signals received from smart logic 278 or signal conditioner 280. For example, a conditioning signal $V_{CON}$ can be generated by signal conditioner 280 in response to feedback from one or more networked or non-networked devices or sensors, such as, for example, an exterior photosensor or photodetector 282, an interior photosensor or photodetector 284, a thermal or temperature sensor 286, or a tint command signal $V_{TC}$. For example, additional embodiments of signal conditioner 280 and $V_{CON}$ are also described in U.S. patent application Ser. No. 13/449,235 naming Brown as inventor, titled CONTROLLING TRANSITIONS IN OPTICALLY SWITCHABLE DEVICES and filed 17 Apr. 2012.

Referring back, $V_{TC}$ can be an analog voltage signal between 0 V and 10 V that can be used or adjusted by users (such as residents or workers) to dynamically adjust the tint of an IGU 102 (for example, a user can use a control in a room or zone of building 104 similarly to a thermostat to finely adjust or modify a tint of the IGUs 102 in the room or zone) thereby introducing a dynamic user input into the logic within microcontroller 274 that determines $V_{COMMAND}$. For example, when set in the 0 to 2.5 V range, $V_{TC}$ can be used to cause a transition to a 5% T state, while when set in the 2.51 to 5 V range, $V_{TC}$ can be used to cause a transition to a 20% T state, and similarly for other ranges such as 5.1 to 7.5 V and 7.51 to 10 V, among other range and voltage examples. In some embodiments, signal conditioner 280 receives the aforementioned signals or other signals over a communication bus or interface 290. In some embodiments, PWM 276 also generates $V_{COMMAND}$ based on a signal $V_{SMART}$ received from smart logic 278, as described below. In some embodiments, smart logic 278 transmits $V_{SMART}$ over a communication bus such as, for example, an Inter-Integrated Circuit ($I^2C$) multi-master serial single-ended computer bus. In some other embodiments, smart logic 278 communicates with memory device 292 over a 1-WIRE device communications bus system protocol (by Dallas Semiconductor Corp., of Dallas, Texas).

In some embodiments, microcontroller 274 includes a processor, chip, card, or board, or a combination of these, which includes logic for performing one or more control functions. Power and communication functions of microcontroller 274 may be combined in a single chip, for example, a programmable logic device (PLD) chip or field programmable gate array (FPGA), or similar logic. Such integrated circuits can combine logic, control and power functions in a single programmable chip. In one embodiment, where one pane 216 has two electrochromic devices 220 (e.g., on opposite surfaces) or where IGU 102 includes two or more panes 216 that each include an electrochromic device 220, the logic can be configured to control each of the two electrochromic devices 220 independently from the other. However, in one embodiment, the function of each of the two electrochromic devices 220 is controlled in a synergistic fashion, for example, such that each device is controlled in order to complement the other. For example, the desired level of light transmission, thermal insulative effect, or other property can be controlled via a combination of states for each of the individual electrochromic devices 220. For example, one electrochromic device may be placed in a colored state while the other is used for resistive heating, for example, via a transparent electrode of the device. In another example, the optical states of the two electrochromic devices are controlled so that the combined transmissivity is a desired outcome.

As described above, in some embodiments, microcontroller 274, or window controller 114 generally, also can have wireless capabilities, such as wireless control and powering capabilities. For example, wireless control signals, such as radio-frequency (RF) signals or infra-red (IR) signals can be used, as well as wireless communication protocols such as WiFi (mentioned above), Bluetooth, Zigbee, EnOcean, among others, to send instructions to the microcontroller 274 and for microcontroller 274 to send data out to, for example, other window controllers 114, network controller 112, or directly to BMS 110. In various embodiments, wireless communication can be used for at least one of programming or operating the electrochromic device 220, collecting data or receiving input from the electrochromic device 220 or the IGU 102 generally, collecting data or receiving input from sensors, as well as using the window controller 114 as a relay point for other wireless communications. Data collected from IGU 102 also can include count data, such as a number of times an electrochromic device 220 has been activated (cycled), an efficiency of the electrochromic device 220 over time, among other useful data or performance metrics.

Window controller 114 also can have wireless power capability. For example, window controller 114 can have one or more wireless power receivers that receive transmissions from one or more wireless power transmitters as well as one or more wireless power transmitters that transmit power transmissions enabling window controller 114 to receive power wirelessly and to distribute power wirelessly to electrochromic device 220. Wireless power transmission includes, for example, induction, resonance induction, RF power transfer, microwave power transfer, and laser power transfer. For example, U.S. patent application Ser. No. 12/971,576 naming Rozbicki as inventor, titled WIRELESS POWERED ELECTROCHROMIC WINDOWS and filed 17 Dec. 2010, incorporated by reference herein, describes in detail various embodiments of wireless power capabilities.

In order to achieve a desired optical transition, the pulse-width modulated power signal is generated such that the positive component $V_{PW1}$ is supplied to, for example, bus bar 244 during the first portion of the power cycle, while the negative component $V_{PW2}$ is supplied to, for example, bus bar 242 during the second portion of the power cycle. As described above, the signals $V_{PW1}$ and $V_{PW2}$ are effectively DC signals as seen by electrochromic device 220 as a result of, for example, the inductance of series inductors 312 and 314 (see FIGS. 5A and 5B) within PWM 276, or of various other components of window controller 114 or electrochromic device 220 in relation to the frequency of the pulse-width modulated power signals $V_{PW1}$ and $V_{PW2}$. More specifically, referring now to FIG. 5C, the inductance is such that the inductors 312 and 314 effectively filter out the highest frequency components in the voltages $V_{TEC}$ and VITO, the voltages applied to the first and second conductive layers 230 and 238, respectively, and thus the effective voltage $V_{EFF}$ applied across the bus bars 242 and 244 is effectively constant when the first and second duty cycles are constant.

In some cases, depending on the frequency (or inversely the duration) of the pulse-width modulated signals, this can result in bus bar 244 floating at substantially the fraction of the magnitude of $V_{PW1}$ that is given by the ratio of the duration of the first duty cycle to the total duration $t_{PWM}$ of the power cycle. Similarly, this can result in bus bar 242 floating at substantially the fraction of the magnitude of $V_{PW2}$ that is given by the ratio of the duration of the second duty cycle to the total duration $t_{PWM}$ of the power cycle. In this way, in some embodiments, the difference between the magnitudes of the pulse-width modulated signal components $V_{PW1}$ and $V_{PW2}$ is twice the effective DC voltage across terminals 246 and 248, and consequently, across electrochromic device 220. Said another way, in some embodiments, the difference between the fraction (determined by the relative duration of the first duty cycle) of $V_{PW1}$ applied to bus bar 244 and the fraction (determined by the relative duration of the second duty cycle) of $V_{PW2}$ applied to bus bar 242 is the effective DC voltage $V_{EFF}$ applied to electrochromic device 220. The current TEFF through the load—electromagnetic device 220—is roughly equal to the effective voltage $V_{EFF}$ divided by the effective resistance (represented by resistor 316) or impedance of the load.

Figure 5A:
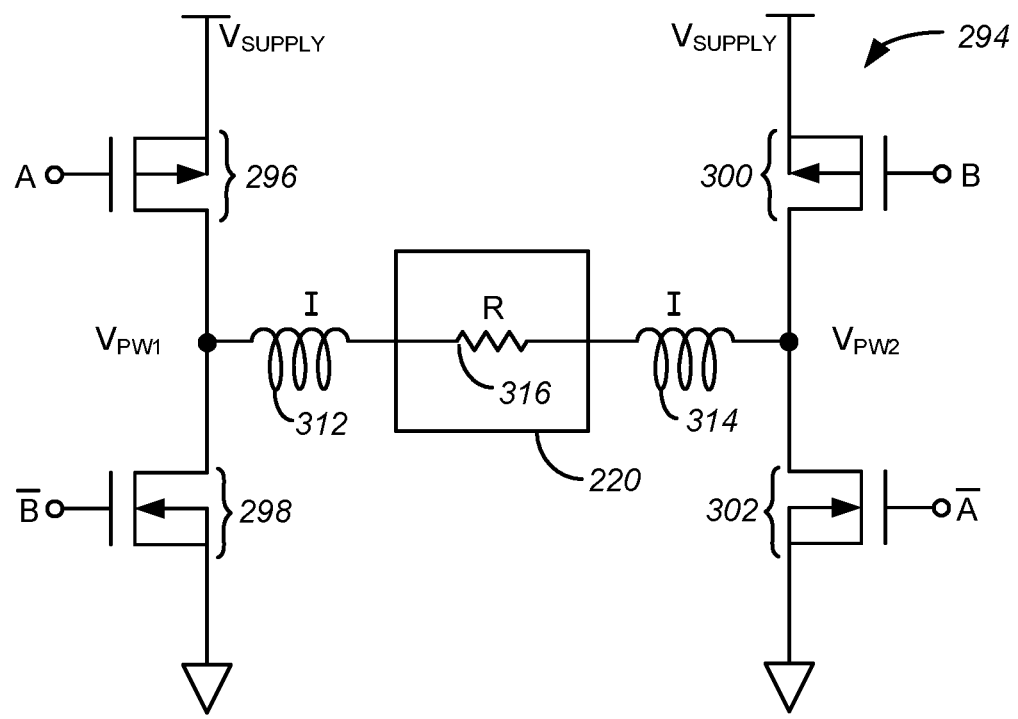
FIG. 5A shows a depiction of an example transistor implementation of a pulse-width modulator circuit.

In some embodiments, the relative durations of the first and second duty cycles—the durations of the $V_{PW1}$ and $V_{PW2}$ pulses, respectively—are based on $V_{COMMAND}$. In some embodiments, in order to generate the two opposing polarity signals $V_{PW1}$ and $V_{PW2}$, PWM 276, and IGU 102 generally, is designed according to an H-bridge configuration 294. In some embodiments, PWM 276 is constructed using four transistors 296, 298, 300, and 302 powered by a supply voltage $V_{SUPPLY}$ as shown in FIG. 5A. Transistors 296, 298, 300, and 302 can be, for example, metal-oxide-semiconductor field-effect transistors (MOSFETs). In some implementations, transistors 296 and 300 are n-type MOSFET transistors while transistors 298 and 302 are p-type MOSFET transistors. In some implementations, during a first portion of operation, the gate of transistor 296 receives signal A, while the gate of transistor 302 receives its complement $\overline{A}$ such that when signal A is high $\overline{A}$ is low, and thus, transistors 296 and 302 are conducting while transistors 298 and 300 are not. In this configuration, current from $V_{SUPPLY}$ is transferred through transistor 296, through the load, including electromagnetic device 220, through transistor 302 and ultimately to ground. This results in a power signal pulse $V_{PW1}$ during this portion of operation. Similarly, in some implementations, during a second portion of operation, the gate of transistor 300 receives signal B, while the gate of transistor 298 receives its complement $\overline{B}$, and thus, transistors 300 and 298 are conducting while transistors 296 and 302 are not. In this configuration, current from $V_{SUPPLY}$ is transferred through transistor 300, through the load, including electromagnetic device 220, through transistor 298 and ultimately to ground. This results in a power signal pulse $V_{PW2}$ during this portion of operation.

Figure 5B:
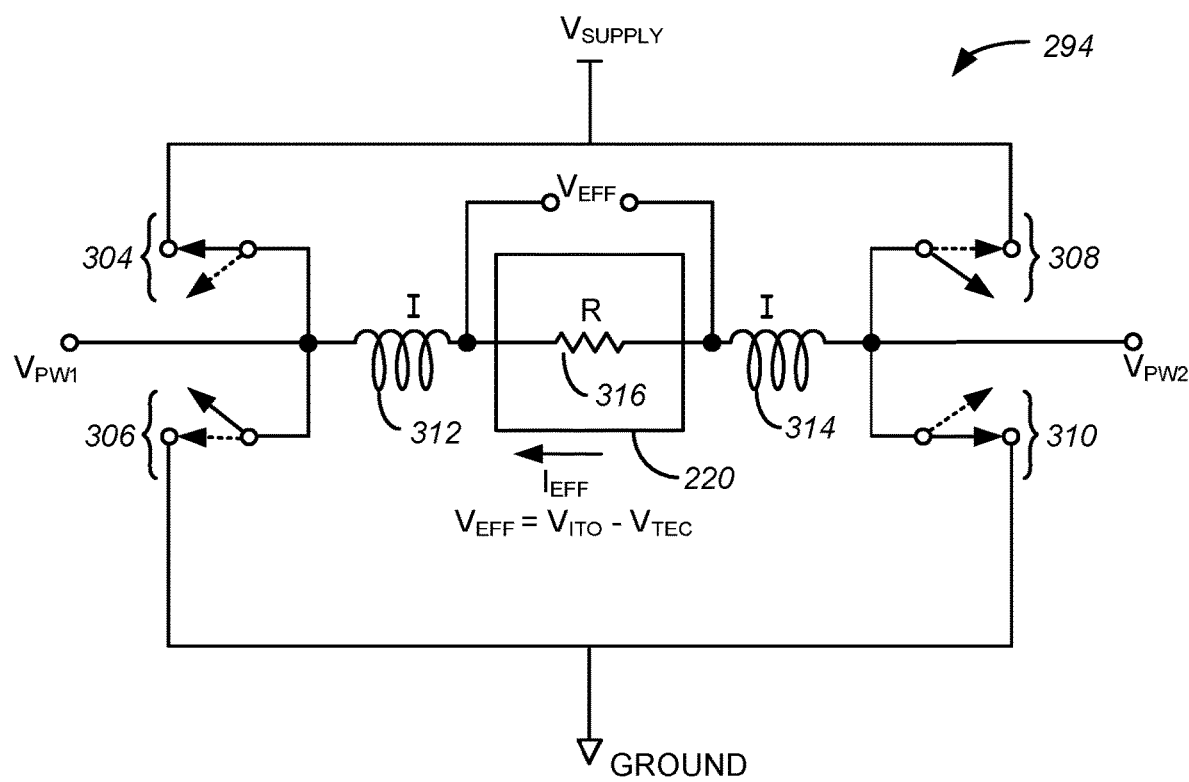
FIG. 5B shows a depiction of an equivalent H-bridge configuration representation of the pulse-width modulator circuit of FIG. 5A.
Figure 5C:
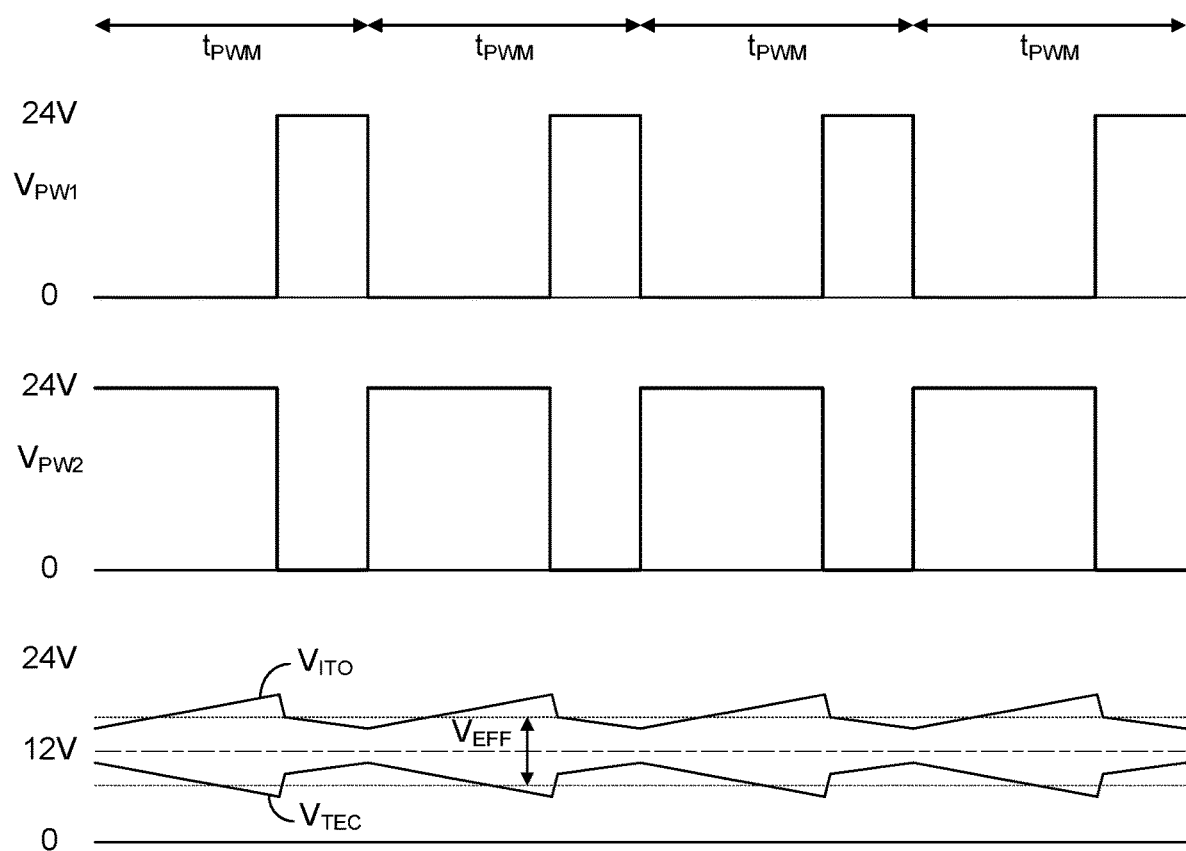
FIG. 5C shows voltage profiles for the configurations of FIGS. 5A and 5B.

FIG. 5B shows a depiction of an equivalent H-bridge configuration representation 294 in which switches 304, 306, 308, and 310 represent transistors 296, 298, 300, and 302. Based on $V_{COMMAND}$, H-Bridge 294 synchronously transitions from a first state (represented by solid arrows), to generate the first duty cycle ($V_{PW1}$ pulse), to a second state (represented by dotted arrows), to generate the second duty cycle ($V_{PW2}$ pulse). For example, in the first state the switches 304 and 310 can be closed (e.g., transistors 296 and 302 are conducting) and switches 306 and 308 can be open (e.g., transistors 298 and 300 are not conducting). Similarly, in the second state switches 306 and 308 can be closed (e.g., transistors 298 and 300 are conducting) and switches 304 and 310 can be open (e.g., transistors 296 and 302 are not conducting). As described above, in some embodiments, the first and second duty cycles of the pulse-width modulated signals $V_{PW1}$ and $V_{PW2}$ are not symmetric; that is, neither the first nor the second duty cycle is a 50% duty cycle. For example, in the case of a 100 kHz signal, $V_{PW1}$ could be pulsed for more than half the time constant $t_{PWM}$ (e.g., more than 5 micro-seconds (μs)) followed by $V_{PW2}$ being pulsed for less than half the time constant $t_{PWM}$ (e.g., less than 5 μs), and so on resulting in a first duty cycle of greater than 50% and a second duty cycle of less than 50%. As a result, even when the magnitudes of $V_{PW1}$ and $V_{PW2}$ are equal and remain constant, the effective voltage at the load (e.g., electrochromic device 220) can be changed from the static DC voltage generated across the load when the duty cycles are symmetric (e.g., $(V_{PW1}-V_{PW2})/2$). Thus, by varying the duty cycles such that they are non-symmetric, a voltage ramp (e.g., ramps 301, 305, 309, or 313) can be applied across the electrochromic device 220. It is this DC voltage that drives the additional ion transfer that causes the optical transitions in electrochromic device 220. Additionally, the duty cycles also can be varied such that a static DC voltage is developed to compensate, for example, for ions trapped in defects.

This method—pulse-width modulation—of applying the DC voltage across electrochromic device 220 provides increased protection from damage as compared to, for example, devices that simply use a battery or other DC voltage source. DC voltages sources such as batteries can result in initial current spikes that can permanently damage the electrochromic device 220 in the form of, for example, defects that trap ions. Furthermore, by adjusting the relative durations of the pulses $V_{PW1}$ and $V_{PW2}$ of each duty cycle based on the command signal $V_{COMMAND}$, the command signal $V_{COMMAND}$ can be used to change the applied DC voltage at the electrochromic device 220 (e.g., to produce ramps 301, 305, 309, and 313) continuously without changing the magnitude of the supply voltage $V_{SUPPLY}$.

Additionally, in some embodiments, the transistors 296, 298, 300, and 302 (or switches 304, 306, 308, and 310) can be configured at certain times to all be insulating (or open) enabling certain embodiments of electrochromic device 220 to hold at a desired optical state without an applied voltage. In some embodiments, this configuration can be used to save energy by not drawing power from $V_{SUPPLY}$, which is typically the main electrical power for the building 104. In such a configuration, the electrochromic device 220 could be left floating. In some other embodiments, in this configuration, the electrochromic device 220 could receive power from another source to hold the desired optical state, such as from, for example, a photovoltaic cell on or within the IGU 102. Similarly, in some embodiments, the transistors 296, 298, 300, and 302 (or switches 304, 306, 308, and 310) can be configured at certain times to all be conducting (or closed) and shorted to ground enabling a discharge of electrochromic device 220. In such embodiments, appropriately sized resistors can be arranged within the H-bridge configuration 294 between each transistor or switch and ground to ease or to make more graceful the discharge of the electrochromic device 220.

In some embodiments, microcontroller 274 is programmed to darken or lighten (e.g., change the % T of) the windows on various sides, surfaces, or zones of a building 104 at certain times of day as well as according to certain times of year, according to certain conditions or in response to other feedback, or based on manual input. For example, microcontroller 274 can be programmed to darken east-facing IGUs 102 at 9:00 am for 1 hour during winter months while at the same time lightening west-facing IGUs. As another example, microcontroller 274 can be programmed to darken an IGU 102 based on light intensity detected outside by a photodetector. In some such embodiments, microcontroller 274 can be programmed to continue to darken the IGU 102 as long as light detected inside by a second photodetector remains above a threshold amount of interior light intensity, or until a lighting system 107 or network controller 112 transmits an input command to window controller 114 commanding the window controller 114 to stop tinting such that the lighting system can remain off or at a lower energy operational level while enabling workers to have enough ambient light or other light to continue working. As another example, microcontroller 274 can be programmed to darken an IGU 102 based on a manual input from a user, for example, in his or her own office relative to a baseline % T commanded by network controller 112.

In some embodiments, the drive or device parameters for a given IGU 102 are stored within the IGU 102, in the frame 218, or in an internal or external electrical connection assembly wired to the frame or IGU. In particular embodiments, the drive and device parameters for the IGU 102 are stored within the plug-in component 250. In some particular embodiments, the drive and device parameters are stored within non-volatile memory device 292, which may be included within or be external to window controller 114 or plug-in component 250, but which, in particular embodiments, is located within IGU 102. In some embodiments, upon inserting and connecting plug-in component 250 into IGU 102 or upon powering or otherwise activating window controller 114, memory device 292 transfers or loads the drive or device parameters to a fast dynamic memory (e.g., a random access memory (RAM), DRAM, NVRAM, or other flash memory) location within microcontroller 274 for quick access by microcontroller 274. In some embodiments, window controller 114 can periodically poll for memory device 292, and when window controller 114 detects memory device 292, it can transfer the drive parameters to the RAM or other faster memory location within microcontroller 274. In some embodiments, memory device 292 can be a chip (e.g., computer chip having processing or logic capabilities in addition to storing capabilities) designed according to the 1-WIRE device communications bus system protocol. In some embodiments, memory device 292 can include solid state serial memory (e.g. EEPROM (EPROM), $I^2C$, or SPI), which can also be programmable memory.

In some embodiments, the drive parameters can be used by microcontroller 274 in conjunction with one or more voltage profiles, current algorithms, or voltage and current operating instructions for transitioning electrochromic device 220 from a first optical state to a second optical state. In some embodiments, microcontroller 274 uses the drive parameters to calculate or select a voltage profile (e.g., a portion of voltage profile 300) and, using the voltage profile, to generate the associated command voltages $V_{COMMAND}$ to achieve the calculated or selected voltage profile. For example, in some embodiments, a voltage profile can be selected from a number of pre-determined profiles (e.g., stored or loaded within microcontroller 274 or other suitable accessible memory location) based on one or more of a multitude of drive parameters including, for example, a current temperature outside, a current temperature inside, a % T of the first or current optical state, a % T of the second or desired optical state, or a desired transition or ramp (e.g., ramp 301 or 309) rate, as well as various initial driving voltages, holding voltages, among other parameters. Some drive parameters, such as % T and ramp rate, can be generated prior to manufacture of the device, for example, based theoretically or empirically on a number of device parameters including, for example, the size, shape, thickness, age, or number of cycles experienced by electrochromic pane 216. In some embodiments, each voltage profile can, in turn, be determined theoretically or empirically prior to manufacture of the device based on the drive and device parameters.

In some embodiments, microcontroller 274 calculates $V_{COMMAND}$ values during operation of IGU 102 based on the selected voltage profile and drive parameters. In some other embodiments, microcontroller 274 selects discrete $V_{COMMAND}$ values previously calculated and stored based on the selected voltage profile and drive parameters. However, as described above, in some cases $V_{COMMAND}$ can additionally be modified according to one or more other input or feedback signals, such as signals $V_{CON}$, $V_{FB}$, or $I_{FB}$, for example, based on input from temperature sensors or photodetectors, voltage feedback from electrochromic device 220 or PWM 276, or current feedback from electrochromic device 220 or PWM 276. For example, as the outside environment becomes brighter, the microcontroller 274 can be programmed to darken the electrochromic device 220, but as the electrochromic device 220 darkens the temperature of the device can rise significantly as a result of the increased photon absorption and, because the tinting of the electrochromic device 220 is dependent on the temperature of the device, the tinting could change if not compensated for by, for example, modifying $V_{COMMAND}$ in response to a signal, such as $V_{CON}$, $V_{FB}$, or $I_{FB}$. Furthermore, in some cases, the voltage profiles themselves stored in the microcontroller 274 or memory device 292 can be modified temporarily (e.g., in RAM) or permanently/perpetually (e.g., in memory device 292) based on signals received from, for example, network controller 112.

In some embodiments, the drive and device parameters stored within a given IGU 102 can be transmitted, for example via CAN communication bus 262, to network controller 112 periodically, in response to certain conditions, or at other appropriate times. Additionally, in some embodiments, drive parameters, voltage profiles, current algorithms, location or zone membership parameters (e.g. at what location or in what zone of the building 104 is this IGU 102 and controller 114), digital output states, and generally various digital controls (tint, bleach, auto, reboot, etc.) can be transmitted from network controller 112 to window controller 114 and microcontroller 274 as well as to memory device 292 for storage and subsequent use. Network controller 112 also can be configured to transmit to microcontroller 274 or memory device 292 information relating to a location of the IGU 102 or building 104 (e.g., a latitude, longitude, or region parameter), a time of day, or a time of year. Additionally, the drive or device parameters can contain information specifying a maximum voltage or current level that can safely be applied to electrochromic device 220 by a window controller 114. In some embodiments, network controller 112 can be programmed or configured to compare the actual current being output to a particular IGU 102 and electrochromic device 220 to the current expected to be output to the IGU 102 based on the device or drive characteristics (e.g., transmitted from the memory device 292 to the microcontroller 274 and to the network controller 112), or otherwise determine that they are different or different beyond a threshold range of acceptability, and thereafter signal an alarm, shut off power to the IGU 102, or take some other action to, for example, prevent damage to the electrochromic device 220. Furthermore, memory device 292 also can include cycling or other performance data for electrochromic device 220.

Figure 6:
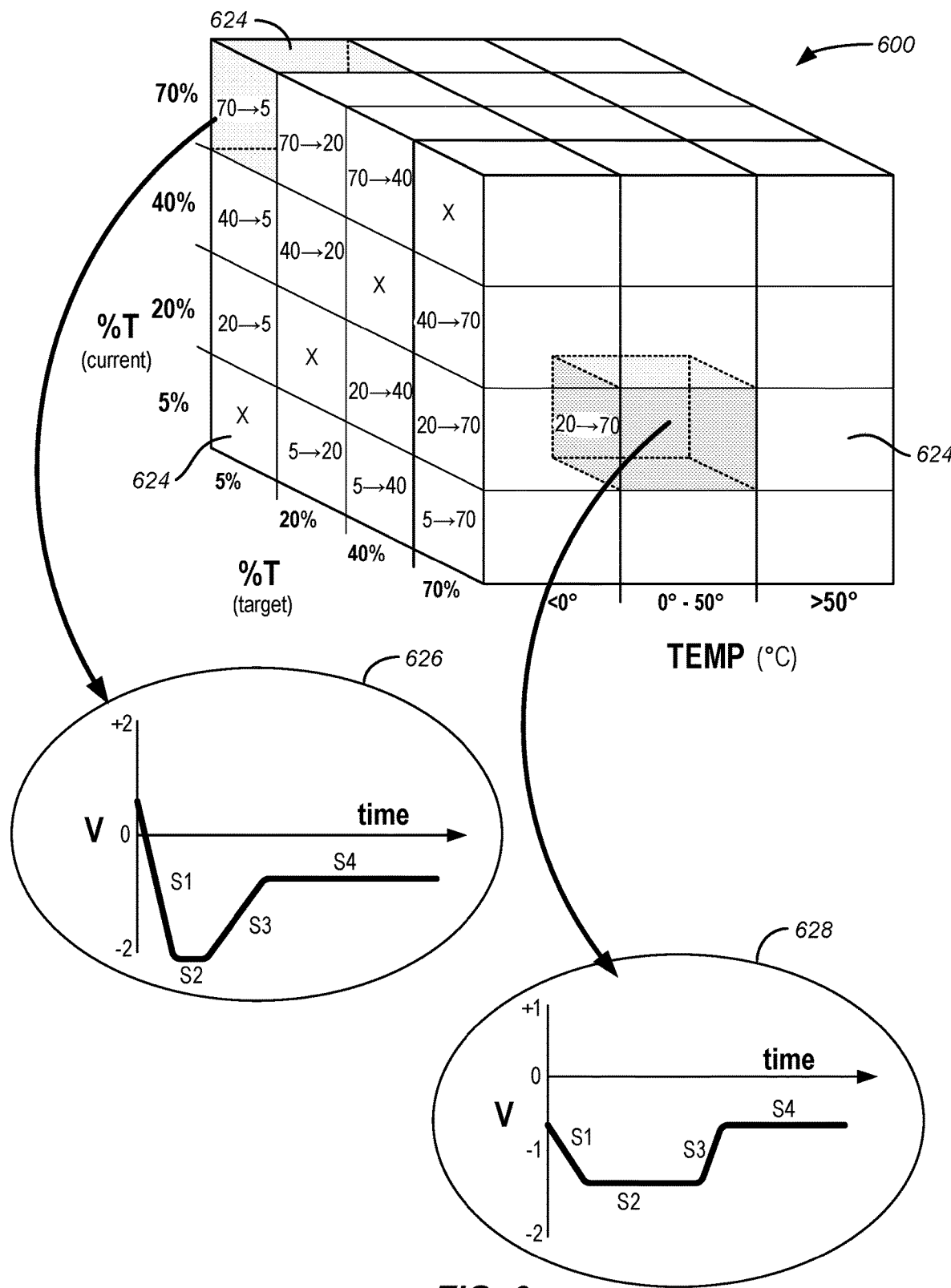
FIG. 6 shows an example 3-dimensional data structure including drive parameters for driving an electrochromic device.

In some embodiments, the drive parameters are organized into an n-dimensional data array, structure, or matrix. FIG. 6 shows an example 3-dimensional data structure 600 of drive parameters for driving an electrochromic device 220. Data structure 600 is a 3-by-4-by-4 matrix of elements 624. A voltage profile is associated with each element 624. For example, matrix element (0, 3, 3) is associated with voltage profile 626 while matrix element (1, 0, 1) is associated with voltage profile 628. In the illustrated example, each matrix element 624 is specified for three drive parameters that define the element 624 and thus the corresponding voltage profile. For example, each matrix element 624 is specified for a given temperature range value (e.g., <0 degrees Celsius, 0-50 degrees Celsius, or >50 degrees Celsius), a current % T value (e.g., 5%, 20%, 40%, or 70%), and a target % T value (e.g., 5%, 20%, 40%, or 70%).

In some embodiments, each voltage profile includes one or more specific parameters (e.g., ramp rate, target voltage, and applied voltage duration) or a combination of one or more specific parameters. For example, each voltage profile can include one or more specific parameters for each of one or more profile portions or zones (e.g., S1, S2, S3, S4) for making the desired optical transition from the current % T, at a current temperature, to a target % T at the same or a different temperature. For example, voltage profile 626 contains parameters to transition a electrochromic window from 70% T to 5% T, at a temperature less than zero degrees Celsius. To complete this transition, voltage profile 626 provides an initial ramp S1 (e.g., a rate in mV/s for a specified time duration or to a specified target voltage value), a first hold S2 (e.g., specified in V for a specified time duration), a second ramp S3 (e.g., a rate in mV/s for a specified time duration or to a specified target voltage value), and a fourth hold S4 (e.g., a specified holding voltage to maintain the target % T). Similarly, voltage profile 628 can provide a different initial ramp S1 (e.g., a flatter voltage ramp), a different hold S2 (e.g., a longer hold at this holding voltage), a different second ramp S3 (e.g., a shorter but steeper ramp), and a different fourth hold S4 (e.g., the holding voltage to maintain the target % T) based on the different drive parameters associated with that element (in this example, transitioning from 20% T to 70% T at a temperature of between zero and fifty degrees Celsius).

Each voltage profile in the n-dimensional data matrix may, in some implementations, be unique. For example, because even at the same temperature, transitioning from 70% T to 5% T often cannot be achieved by a simple reversal of the voltage profile used to transition from 5% T to 70% T, a different voltage profile may be required or at least desirable. Put another way, by virtue of the device architecture and materials, bleaching is not simply the reverse of coloring; devices often behave differently for each transition due to differences in driving forces for ion intercalation and deintercalation to and from the electrochromic materials.

In other embodiments, the data structure can have another number of dimensions n, that is, be more or less granular than matrix 600. For example, in some embodiments, more drive parameters can be included. In one embodiment, 288 drive parameters are used including three temperature range values, four current % T values, and four target % T values resulting in a 3-dimensional matrix having 36 matrix elements and 72 corresponding voltage profiles, each of which has one or more specific parameters (e.g., ramp rate, target voltage, and applied voltage duration, or a combination of one or more specific parameters) for each of one or more profile portions or zones (e.g., S1, S2, S3, . . . ). In other embodiments, the number of temperature bins or ranges of values can be increased or decreased (e.g., 5 or more temperature range values), the number of possible current % T values can be increased or decreased (e.g., there could be eight possible optical states such as 5% T, 15% T, 25% T, 35% T, 45% T, 55% T, 65% T, and 75% T), the number of possible target % T values can be increased or decreased (e.g., to match the possible current % T states), among other suitable modifications. Additionally, the voltage profiles associated with each element of the matrix may have more than four profile portions or zones (e.g. S1-S8) with associated parameters. In some embodiments, for example, 8 zones are permitted to be specified for each voltage profile, 12 voltage profiles are permitted to be specified for the current ambient temperature range, and 3 sets of 12 profiles are permitted to be specified for the 3 temperature ranges specified. That combines to 288 parameters for the voltage profile alone. Additional information also can be stored within memory device 292.

Additionally, in some embodiments in which a single window controller 114 controls and drives two or more IGUs 102, each IGU 102 can still include its own memory device 292. In such embodiments, each memory device 292 transmits its drive parameters to the single window controller 114 and window controller 114, and particularly microcontroller 274, uses the drive parameters for the IGU having the smallest size (and hence the lowest power requirements) to calculate $V_{COMMAND}$ as an added safety to prevent damage. For example, window controller 114 can include logic to identify the IGU size (e.g., length, width, thickness, surface area, etc.) or the IGU 102 can store size information within memory that can then be read by controller 114, e.g., by microcontroller 274. In some embodiments, the microcontroller can compare the drive parameters for two coupled IGUs 102, determine that incompatible IGUs have been connected based on the compared drive parameters, and send an alarm to the BMS 110 or network controller 112. In some embodiments, the microcontroller 274 can use the drive parameters of the parallel-connected IGUs 102 to determine a safe maximum current drive for the aggregate group to further prevent damage to the IGUs.

Additionally, in some embodiments, each window controller 114 also can be configured to compensate for transmission losses such as, for example, voltage drops across bus bars 242 or 244 or down other transmission lines in between PWM 276 and bus bars 242 and 244. For example, because PWM 276 (or some other component of window controller 114 or IGU 102) can be configured to provide current feedback (e.g., $I_{FB}$), microcontroller 274 (or some other logic component of window controller 114) can be configured to calculate the voltage drop caused by transmission losses. For example, resistor $R_T$ in FIG. 4 models the transmission line resistance while resistor $R_S$ in FIG. 4 models a series resistance. $R_T$ and $R_S$ are inherent to the transmission line or other system components. As current is supplied from the window controller 114 it passes through $R_T$, through IGU 102, and through $R_S$, before returning to the window controller 114 closing the loop. Because the current through $R_T$, IGU 102, and $R_S$ is known—by using $I_{FB}$ to set a fixed current output of the PWM 276 (e.g. 1 Ampere)—and because the differential amplifier 422 can be used to effectively measure the voltage drop across $R_S$, the values of $R_S$ and $R_T$ can be calculated. For all intents and purposes, $R_T$ can be approximated by $R_S$. Now, during normal operation of the device 220, because the current demand through the IGU 102 is not constant, knowing the effective resistance of the combination Rs+Rt allows for dynamically adjusting the voltage output from the window controller 114 so the developed voltage $V_{ACTUAL}$ at the terminals of the IGU 102 can be calculated as $V_{ACTUAL}=V_{TARGET}+I_{ACTUAL}*(R_S \pm R_T)$ or $V_{ACTUAL}=V_{TARGET}+2V(R_S)$, where $V(R_S)$ is the voltage drop across $R_S$.

In one or more aspects, one or more of the functions described may be implemented in hardware, digital electronic circuitry, analog electronic circuitry, computer software, firmware, including the structures disclosed in this specification and their structural equivalents thereof, or in any combination thereof. Certain embodiments of the subject matter described in this specification also can be implemented as one or more computer programs, i.e., one or more modules of computer program instructions, encoded on a computer storage media for execution by, or to control the operation of, data processing apparatus.

Various modifications to the embodiments described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented. Additionally, as used herein, "or" may imply "and" as well as "or;" that is, "or" does not necessarily preclude "and," unless explicitly stated or implicitly implied.

Certain features that are described in this specification in the context of separate embodiments also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this does not necessarily mean that the operations are required to be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for tinting one or more tintable windows, the apparatus comprising at least one controller that is configured to:
 operatively couple to one or more sensors comprising a temperature sensor;
 operatively couple to the one or more tintable windows;
 determine a drive parameter based at least in part on data from the one or more sensors;
 compare the drive parameter with sets of stored power profiles arranged in an n-dimensional data structure of data elements, each data element of the data elements corresponding to a respective power profile of stored power profiles and each dimension of the n-dimensional data structure corresponding to a different drive parameter, wherein a first dimension corresponds to target transmissivity values and a second dimension corresponds to current transmissivity values; and
 utilize-the comparison to identify a stored power profile of the stored power profiles that corresponds to the drive parameter, wherein the stored power profile identified is utilized to alter tint of the one or more tintable windows.

2. The apparatus of claim 1, wherein the n-dimensional data structure comprises at least three dimensions.

3. The apparatus of claim 1, wherein at least one dimension of the n-dimensional data structure corresponds to temperature.

4. The apparatus of claim 2, wherein the one or more tintable windows comprise at least two tintable windows, and wherein the at least one controller is further configured to:
 receive first drive parameters from a first tintable window of the at least two tintable windows and second drive parameters from a second tintable window of the at least two tintable windows, wherein the first drive parameters indicate material properties of the first tintable window and the second drive parameters indicate material properties of the second tintable window, and
 compare the first drive parameters and the second drive parameters to generate a comparison for altering tint of at least one tintable window of the at least two tintable windows.

5. The apparatus of claim 4, wherein the material properties comprise: a size of the at least two tintable windows, a shape of the at least two tintable windows, a thickness of the at least two tintable windows, an age of the at least two tintable windows, or a number of cycles experienced by the at least two tintable windows.

6. A system for tinting one or more tintable windows, the system comprising:
 a network that is configured to:
  operatively couple to the one or more tintable windows;
  operatively couple to one or more sensors comprising a temperature sensor or a photodetector;
  operatively couple to at least one database comprising sets of stored power profiles arranged in an n-dimensional data structure of data elements, each data element of the data elements corresponding to a respective power profile of stored power profiles and each dimension of the n-dimensional data structure corresponding to a different drive parameter, wherein at least one dimension of the n-dimensional data structure is temperature or a temperature range, and wherein the n-dimensional data structure comprises a first dimension corresponding to target transmissivity values and a second dimension corresponds to current transmissivity values;
  transmit a determination of a drive parameter based at least in part on data from the one or more sensors;
  transmit a comparison of the drive parameter with the sets of stored drive parameters; and
  transmit an identification of a stored power profile of the stored power profiles that corresponds to the drive parameter, wherein the stored power profile is identified using the comparison, and wherein the stored power profile identified is utilized to alter tint of the one or more tintable windows.

7. The system of claim 6, wherein the n-dimensional data structure comprises at least three dimensions.

8. The system of claim 6, wherein the network is configured to utilize a wireless communication protocol to receive and/or transmit signals, wherein the wireless communication optionally abides by one or more wireless communication protocols comprising WiFi, Bluetooth, Zigbee, or EnOcean.

9. The system of claim 6, wherein the network is configured for wired communication.

10. The system of claim 6, wherein the network is configured for power transmittance, and is operatively coupled to a power source.

11. An apparatus for controlling tint of a plurality of tintable windows, the apparatus comprising at least one controller that is configured to:
 operatively couple to the plurality of tintable windows;
 receive first drive parameters from a first tintable window of the plurality of tintable windows and second drive parameters from a second tintable window of the plurality of tintable windows, wherein the first drive parameters indicate material properties of the first tintable window and the second drive parameters indicate material properties of the second tintable window;
 compare the first drive parameters and the second drive parameters to generate a comparison;
 if the comparison indicates that the first and second tintable windows are compatible, then tint the first tintable window and the second tintable window using the drive parameters of the first or second tintable window that has the smaller size as indicated by the received material properties; and
 if the comparison indicates that the first and second tintable windows are not compatible, then tint the first tintable window or the second tintable window based at least in part on that window's reported drive parameters.

12. The apparatus of claim 11, wherein the material properties comprise: a size of the one or more tintable windows, a shape of the one or more tintable windows, a thickness of the one or more tintable windows, an age of the one or more tintable windows, or a number of cycles experienced by the one or more tintable windows.

13. The apparatus of claim 11, wherein the at least one controller is further configured to determine safety parameters for the first tintable window and the second tintable window based at least in part on the comparison.

* * * * *